US008937737B2

(12) United States Patent
Tsutsumi et al.

(10) Patent No.: US 8,937,737 B2
(45) Date of Patent: Jan. 20, 2015

(54) IMAGE PROCESSING APPARATUS, THUMBNAIL IMAGE GENERATING METHOD, AND RECORDING MEDIUM

(75) Inventors: Takahiro Tsutsumi, Toyohashi (JP); Kenji Matsui, Arakawa-ku (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 172 days.

(21) Appl. No.: 13/544,049

(22) Filed: Jul. 9, 2012

(65) Prior Publication Data

US 2013/0016405 A1 Jan. 17, 2013

(30) Foreign Application Priority Data

Jul. 14, 2011 (JP) ................. 2011-156149

(51) Int. Cl.
*H04N 1/32* (2006.01)
(52) U.S. Cl.
CPC ...... *H04N 1/32128* (2013.01); *H04N 2201/325* (2013.01); *H04N 2201/0094* (2013.01); *H04N 2201/3202* (2013.01); *H04N 2201/3226* (2013.01)
USPC ........................................ 358/1.15
(58) Field of Classification Search
CPC ............. G06F 17/30126; G06F 17/30997; G06K 9/00463; G06K 1/32128; G06K 1/3214; G06K 1/3215
USPC ............... 358/1.9, 1.6, 1.12, 1.13, 1.15, 1.16, 358/1.18; 707/728
See application file for complete search history.

(56) References Cited

U.S. PATENT DOCUMENTS

| 7,877,689 | B2 * | 1/2011 | Gilley .......................... 715/723 |
| 8,447,760 | B1 * | 5/2013 | Tong et al. ................... 707/728 |
| 8,456,703 | B2 * | 6/2013 | Hayakawa ..................... 358/1.9 |
| 2007/0088674 | A1 * | 4/2007 | Kawate et al. ................... 707/2 |
| 2009/0231633 | A1 * | 9/2009 | Matsuda ....................... 358/448 |
| 2010/0175028 | A1 * | 7/2010 | Nozaki ......................... 715/830 |
| 2010/0231958 | A1 * | 9/2010 | Okigami ...................... 358/1.15 |
| 2010/0332497 | A1 * | 12/2010 | Valliani et al. ................ 707/759 |
| 2011/0075932 | A1 | 3/2011 | Komaki |
| 2011/0116760 | A1 * | 5/2011 | Gilley .......................... 386/230 |
| 2011/0282840 | A1 * | 11/2011 | Georgis et al. ................ 707/647 |
| 2012/0259927 | A1 * | 10/2012 | Lockhart ....................... 709/206 |
| 2012/0266103 | A1 * | 10/2012 | Shah ............................ 715/784 |

FOREIGN PATENT DOCUMENTS

| JP | 2004-289218 A | 10/2004 |
| JP | 2008-298903 A | 12/2008 |

(Continued)

OTHER PUBLICATIONS

Office Action (Notification of Reasons for Refusal) dated Aug. 13, 2013, by the Japanese Patent Office in corresponding Japanese Patent Application No. 2011-156149, and an English Translation of the Office Action (6 pages).

*Primary Examiner* — Jerome Grant, II
(74) *Attorney, Agent, or Firm* — Buchanan Ingersoll & Rooney PC

(57) ABSTRACT

An image processing apparatus comprises: a divider which divides a document consisting of a plurality of pages, into separate block units; a block unit selector which selects a block unit most likely linked to a user to view a thumbnail image, among the block units obtained by the divider; and a thumbnail image generator which generates a thumbnail image based on an image and/or text from the block unit selected by the block unit selector.

20 Claims, 27 Drawing Sheets

(56) References Cited

FOREIGN PATENT DOCUMENTS

| | | |
|---|---|---|
| JP | 2009-048450 A | 3/2009 |
| JP | 2010-72842 A | 4/2010 |
| JP | 2010-128518 A | 6/2010 |
| JP | 2010-147518 A | 7/2010 |
| JP | 2011-70558 A | 4/2011 |

* cited by examiner

| Block Unit | Strings detected from the block unit | | | The number of the strings detected from the block unit |
|---|---|---|---|---|
| | Name | Business Section | Personal ID | |
| | "User B" | "ppp Development Department" | "A12345" | |
| 1 xxx Technical Report | Detected | Not detected | Detected | 1 |
| 2 yyy Technical Report | Not detected | Not detected | Not detected | 3 |
| 3 zzz Technical Report | Detected | Detected | Detected | 0 |

101c

| Block Unit | Strings detected from the block unit | | | The number of the strings detected from the block unit |
| --- | --- | --- | --- | --- |
| | Name | Business Section | Personal ID | |
| | "User A" | "ppp Development Department" | "A12333" | |
| 1 xxx Technical Report | Not detected | Not detected | Not detected | 3 |
| 2 yyy Technical Report | Detected | Not detected | Detected | 1 |
| 3 zzz Technical Report | Detected | Detected | Detected | 0 |

IMAGE PROCESSING APPARATUS, THUMBNAIL IMAGE GENERATING METHOD, AND RECORDING MEDIUM

This application claims priority under 35 U.S.C. §119 to Japanese Patent Application No. 2011-156149 filed on Jul. 14, 2011, the entire disclosure of which is incorporated herein by reference in its entirety.

BACKGROUND OF THE INVENTION

1. Field of the Invention

The present invention relates to: an image processing apparatus such as a multifunctional digital image forming apparatus which is capable of generating thumbnail images; a thumbnail image generating method for the image processing apparatus; and a recording medium with a thumbnail image generating program being stored thereon to make a computer of the image processing apparatus implement the thumbnail image generating method.

2. Description of the Related Art

The following description sets forth the inventor's knowledge of related art and problems therein and should not be construed as an admission of knowledge in the prior art.

Usually, a small-sized image of a cover page of an electronic document (also referred to as a file) is displayed as a thumbnail image, and this is very helpful for users to remember the content.

However, if not remembering the thumbnail image at all, users would need to open the file to make sure if it is really not the one that they are trying to find.

If it is a document including various sets of topics which poorly correlate with each other and also can serve independently as well, for example a file consisting of a couple of years of annual technical reports, a thumbnail image of a particular page or part of the document would not be always helpful for every user to remember the content.

More specifically, if it is a document including a technical report created by User A and a technical report created by User B, a thumbnail image of a part of the document created by User A would be definitely helpful for User A to remember the content while a thumbnail image of a cover page or a part of the document created by User B would not be always helpful for User A because he/she might not have viewed the content.

To make thumbnail images more helpful, as suggested in Japanese Unexamined Patent Publication No. 2008-298903, there has been an image processing apparatus which is allowed to: display a plurality of thumbnail images which are small-sized images; and pick up from each of the images a particular part which is easy to recognize the image, for example a beginning part of the image, to show at a higher magnification in a balloon window popping up close to the image. The image processing apparatus makes it fairly easy for users to recognize all the images and find a target image among them.

Also, as suggested in Japanese Unexamined Patent Publication No. 2010-072842, there has been an image processing apparatus which is allowed to: read out an image from a document; and display thumbnail images of objects included in the readout image, on a display in different styles depending on which group the objects belong to, for example: document titles, chapter titles, drawings, tables, pictures, handwritten texts, and keywords. The image processing apparatus makes it fairly easy for users to find a target page based on the thumbnail images.

However, according to the Japanese Unexamined Patent Publications No. 2008-298903 and No. 2010-072842, the image processing apparatus generates thumbnail images regardless of the user operating the image processing apparatus itself, and thus cannot solve the problem described above, that is, a thumbnail image of a particular page or part of a document created by a first user would be definitely helpful for the first user to remember the content while a thumbnail image of a particular page or part of a document created by a second user would not be always helpful for the first user because he/she might not have viewed the content.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing apparatus comprising:

a divider which divides a document consisting of a plurality of pages, into separate block units;

a block unit selector which selects a block unit most likely linked to a user to view a thumbnail image, among the block units obtained by the divider; and a thumbnail image generator which generates a thumbnail image based on an image and/or text from the block unit selected by the block unit selector.

A second aspect of the present invention relates to a thumbnail image generating method for the image processing apparatus, comprising:

dividing a document consisting of a plurality of pages, into separate block units;

selecting a block unit most likely linked to a user to view a thumbnail image, among the block units obtained; and generating a thumbnail image based on an image and/or text from the block unit selected.

A third aspect of the present invention relates to a non-volatile computer-readable recording medium with a thumbnail image generating program being stored thereon to make a computer of an image processing apparatus execute:

dividing a document consisting of a plurality of pages, into separate block units;

selecting a block unit most likely linked to a user to view a thumbnail image, among the block units obtained; and generating a thumbnail image based on an image and/or text from the block unit selected.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, a mode of implementing the present invention will be described with reference to the accompanying drawings.

Figure 1:
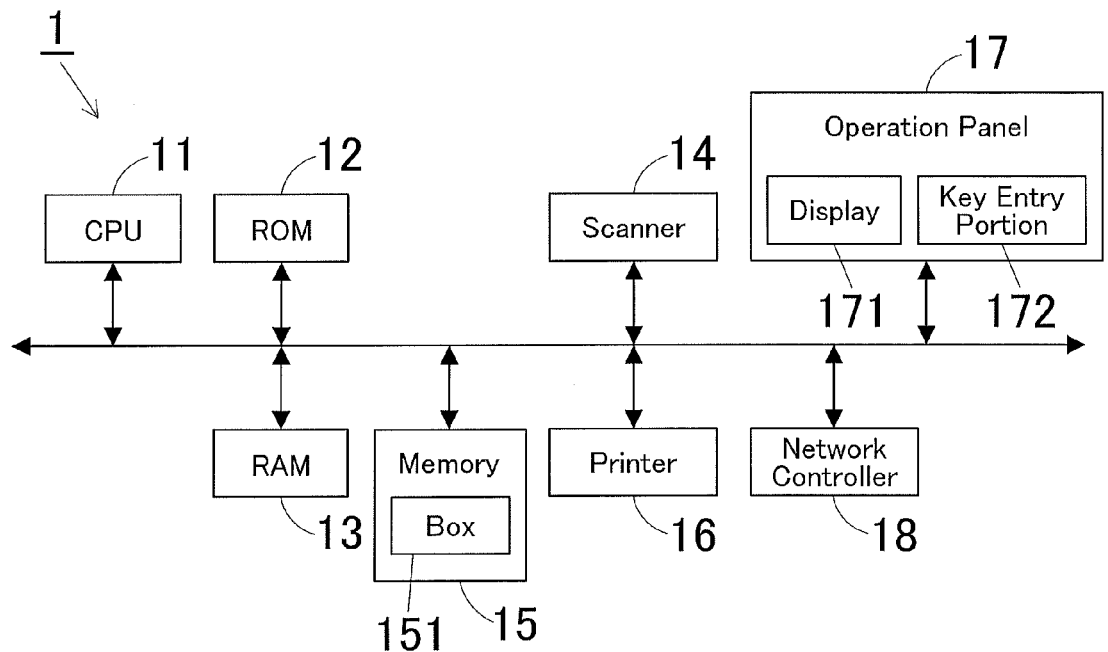
FIG. 1 is a block diagram illustrating a configuration of an image processing apparatus according to one mode of implementing the present invention.

FIG. 1 is a block diagram illustrating a configuration of an image processing apparatus according to one mode of implementing the present invention.

In this mode of implementation, a MFP (Multi Function Peripheral), which is a multifunctional digital image forming apparatus collectively having a plurality of functions, for example: copier function, printer function, facsimile function, and scanner function, is employed as an image processing apparatus. This MFP is provided with a CPU 11, a ROM 11, a RAM 13, a scanner 14, a memory 15, a printer 16, an operation panel 17, a network controller (NIC) 18, and the like.

The CPU 11 enables the image forming apparatus 1 to execute the basic functions such as copy function, printer function, scanner function, and facsimile function, by centrally controlling every part of the image forming apparatus 1. Furthermore, in this mode of implementation, the CPU 11 allows the image forming apparatus 1 to generate thumbnail images of a document, which later will be described in detail.

The ROM 12 is a memory which stores an operation program and the like for the CPU 11.

The RAM 13 provides a work area for the CPU 11 to execute processing according to an operation program.

The scanner 145 reads images of a document placed on a document glass (not illustrated in this Figure) so as to output image data therefrom.

The memory 15, which is composed of a non-volatile recording device such as a hard disk drive (HDD), stores an operation log of every user having operated the image processing apparatus 1.

One or more memory areas herein also referred to as Boxes 151 are made in the memory 15 in order to allow storing documents thereon. The Boxes 151 include: a user's private box allowing only the owner user to access; a departmental private box allowing only the member users to access; and a public box allowing unspecified users to access.

The printer 16 prints out image data read out from a document by the scanner 14, print data received from the user terminal 2, and the like according to a specified mode.

The operation panel 17, which is used for various entry operations, is provided with: a display 171 composed of a liquid crystal display with touch-panel functionality, displaying messages, operation screens, and the like; and a key entry portion 172 including numeric keys, a Start key, a Stop key, and the like.

The network controller 18 transmits and receives data by controlling communications with other image processing apparatuses, other external devices such as user terminals, and the like on the network.

Hereinafter, a thumbnail image generating operation of the image processing apparatus 1 as illustrated in FIG. 1 will be explained.

Here, for example, the image processing apparatus 1 starts a thumbnail image generating operation when instructed by user to execute, a transmission job to transmit a target document from a Box 151 to a certain address or a print job to print a target document from a Box 151. However, it does not mean that the image processing apparatus 1 has to start it in a specific event like that: the image processing apparatus 1 alternatively may start it when a thumbnail image generating button displayed on the display 171 of the operation panel 17 is pressed by user. Here, the image processing apparatus 1 displays generated thumbnail images on the display 171 of the operation panel 17, prints them, or transmits them to a certain address along with the target document. However, it does not mean that the image processing apparatus 1 has to perform a specific operation on generated thumbnail images.

Figure 2:
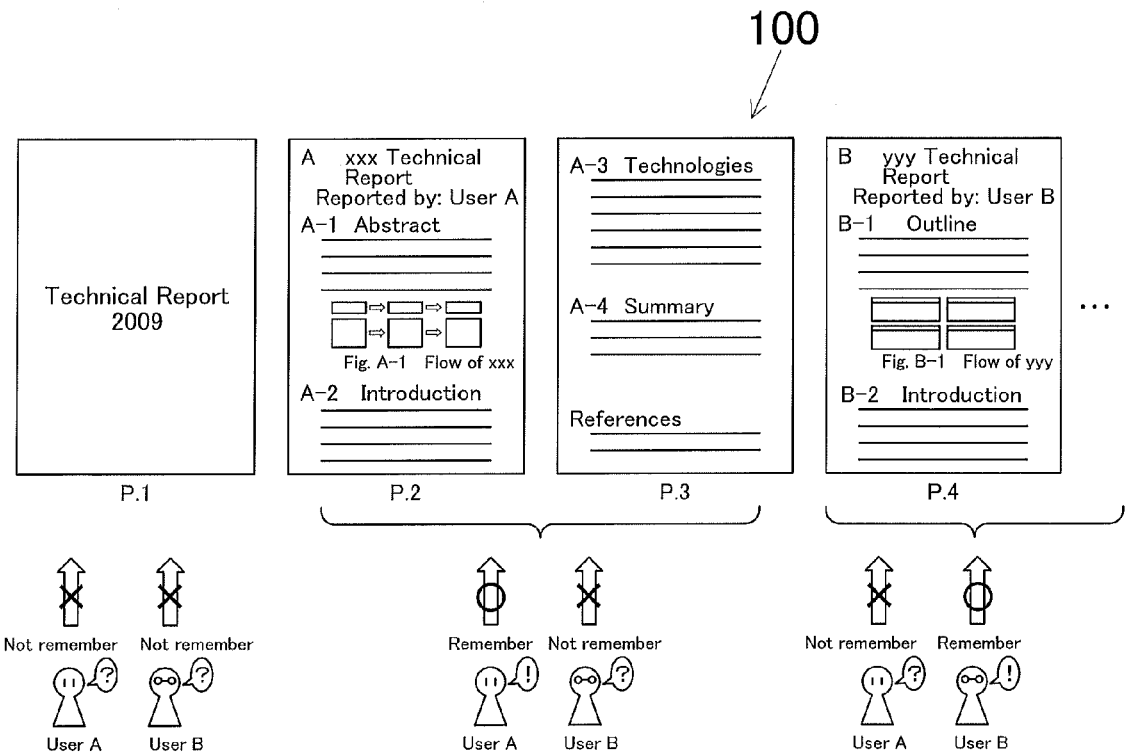
FIG. 2 is a view for explanation, illustrating pages of a document and users viewing them.
Figure 3:
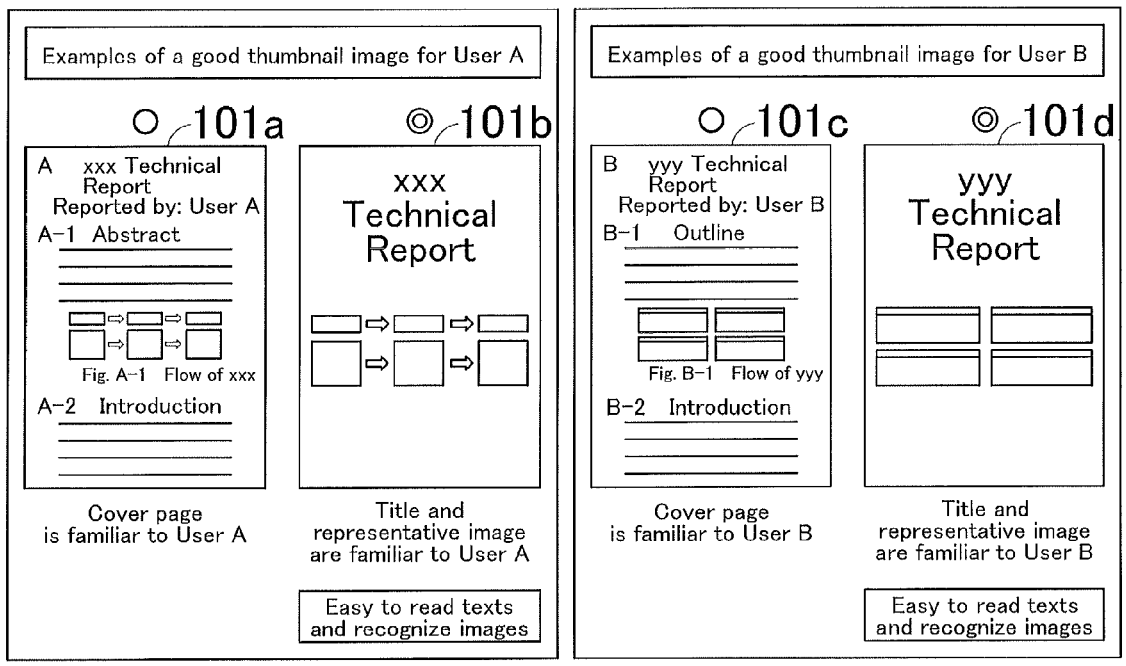
FIG. 3 is a view illustrating thumbnail images to show User A and other thumbnail images to show User B.

In this mode of implementation, the image processing apparatus 1 generates thumbnail images personalized for each user. For example, as illustrated in FIG. 2, there is a technical report which is herein referred to as document (file) 100, including: a cover page (Page 1) with the document title "Technical Report 2009"; Pages 2 and 3 carrying the content created by User A; and Page 4 and the rest of the pages carrying the content created by User B. In such a specific case, even if not remembering the document title "Technical Report 2009" given to the cover page, User A would more than likely remember the content of the Pages 2 and 3 because he/she is the creator thereof. Similarly, even if not remembering the document title "Technical Report 2009" given to the cover page, User B would remember the content of the Page 4 because he/she is the creator thereof. In this mode of implementation, neither a small-sized image of the cover page or a document title given to the cover page is not employed anymore: the Users A and B are allowed to personalize thumbnail images based on a part of the document that they remember because of being the creator thereof, as illustrated in FIG. 3. That could make it fairly easy for the Users A and B to determine whether or not it is a target file and recognize the content of the file. In FIG. 3, the code 101a indicates a thumbnail image which is a small-sized image of a cover page of a report that User A remember; the code 101b indicates a thumbnail image with a title and a representative image of the same report. Similarly, the code 10c indicates a thumbnail image which is a small-sized image of a cover page of a report that User B remember; the code 101d indicates a thumbnail image with a title and a representative image of the same report. Thumbnail images are not necessarily limited to a certain type. However, it is preferred that the thumbnail images 101b and 101d are better in picture quality than the thumbnail images 101a, so that the Users A and B could recognize the content of their reports more easily.

[Mode of Implementation 1]

Figure 4:
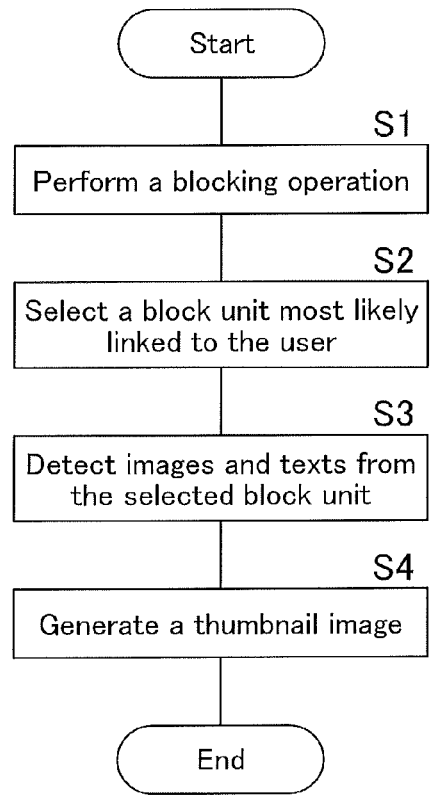
FIG. 4 is a flowchart representing a processing routine of the image processing apparatus, which is a thumbnail image generating operation.

FIG. 4 is a flowchart representing a processing routine of the image processing apparatus, which is a thumbnail image generating operation. The processing routines of FIG. 4 and the following figures are executed by the CPU 11 of the image processing apparatus 1 according to operation programs stored on a recording medium such as the ROM 12.

Figure 5:
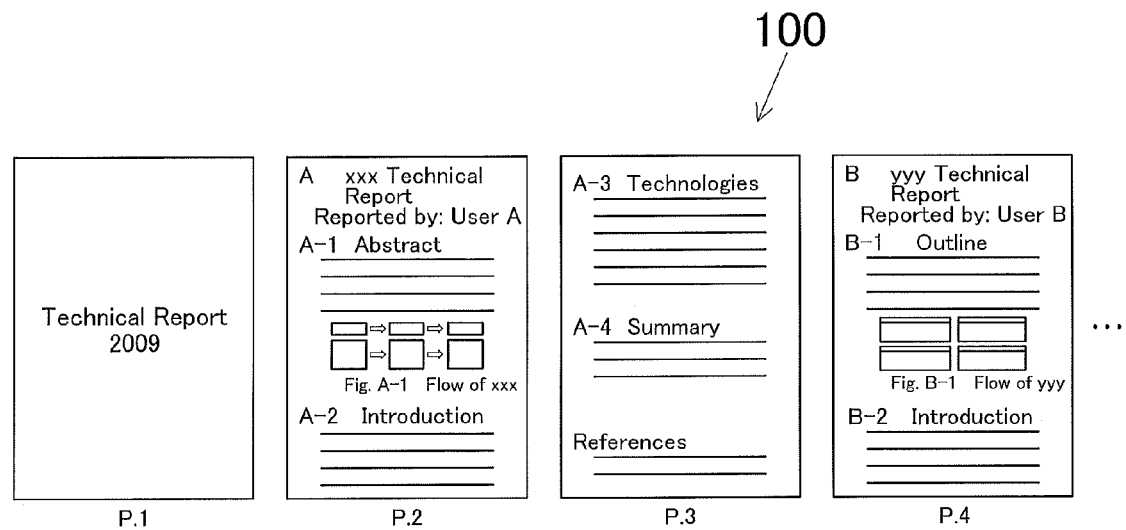
FIG. 5 is a view illustrating pages of a document based on which thumbnail images are generated.

In the Mode of Implementation 1, thumbnail images for a document 100 are generated and displayed as illustrated in FIG. 5, in which a cover page (Page 1) shows a title of the document, "Technical Report 2009"; Pages 2 and 3 show the report created by User A; and Page 4 and the rest of the pages show the report created by User B. The document 100 is stored on a Box 151 of the memory 15.

In Step S1, the document 100 is selected by a user from the Box 151, and a blocking operation is performed on the document 100 to divide into block units. In Step S2, a block unit most likely linked to the user (hereinafter will be referred to as most likely relevant block units) is determined. In the Mode of Implementation 1, it is the user currently operating the image processing apparatus 1 to view thumbnail images.

Subsequently objects for thumbnail images such as images and texts are detected from the most likely relevant block unit in Step S3, and thumbnail images are generated using the detected objects in Step S4.

Hereinafter, the blocking operation of Step S1 will be described in detail.

Figure 6:
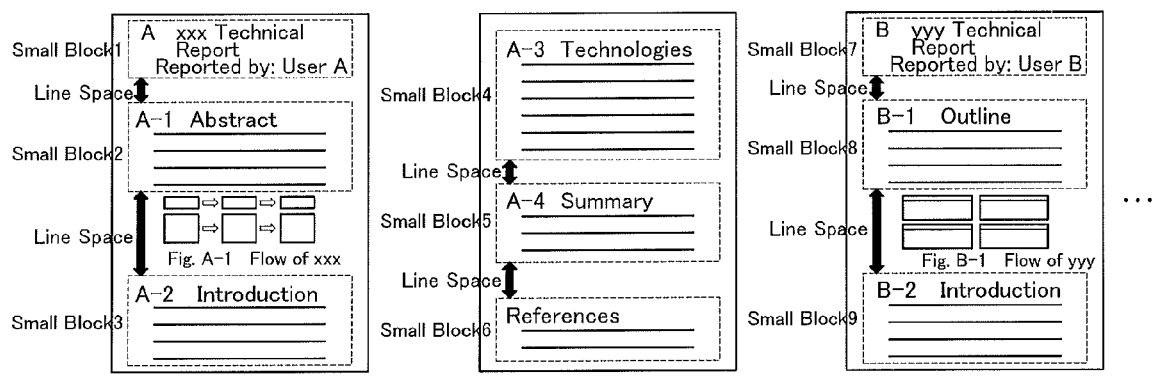
FIG. 6 is a view to explain how to divide one page into multiple block units.

First of all, in the blocking operation, line spaces are detected from the document to divide the document into minimum blocks (hereinafter will be referred to as small blocks) at the line spaces. For example, the document is divided into small blocks 1 to 9, as illustrated in FIG. 6.

Subsequently, chapter codes are detected from the small blocks and separated from chapter titles (including a document title) which follow the chapter codes, by delimiters (such as hyphens and periods). If there are no chapter codes, the chapter titles are rated by size, and accordingly the small blocks are organized at hierarchical levels.

Figure 7:
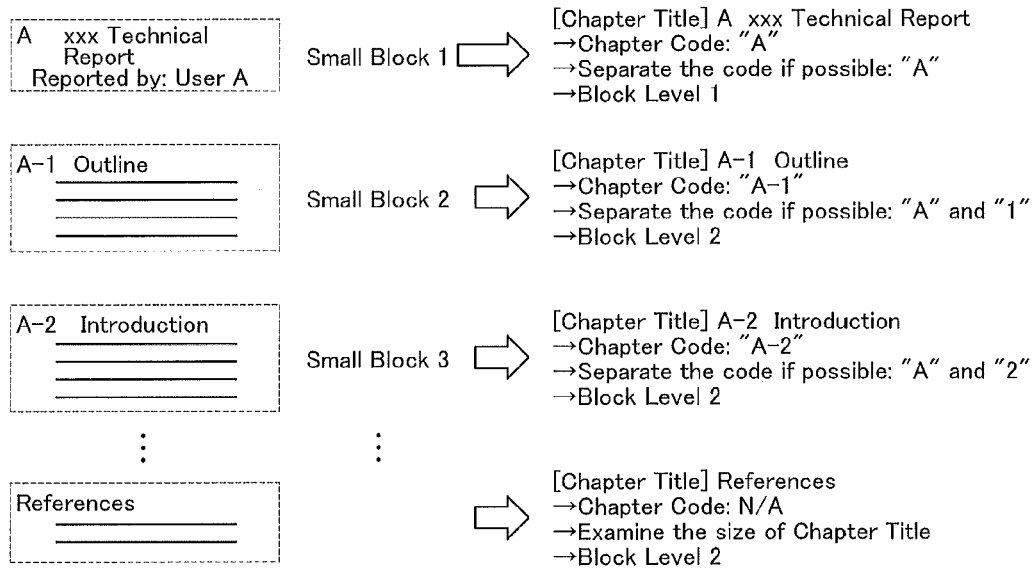
FIG. 7 is another view to explain how to divide one page into multiple block units.

For example, as illustrated in FIG. 7, the chapter code "A" is detected from the small block 1 and separated from the chapter title "A xxx Technical Report" by a hyphen. The small block 1 with a piece "A" is organized at block level 1. The chapter code "A-1" is detected from the small block 2, separated from the chapter title "A-1 Outline" by a hyphen, and further separated into pieces "A" and "1" by a hyphen. The small block with a pair of the pieces "A" and "1" is organized at block level 2. Similarly, chapter codes are detected from the rest of the small blocks; separated from chapter titles which follow the chapter codes, by hyphens; and if needed, further separated into pieces by hyphens. In this way, all the small blocks are organized at various block levels.

Figure 8:
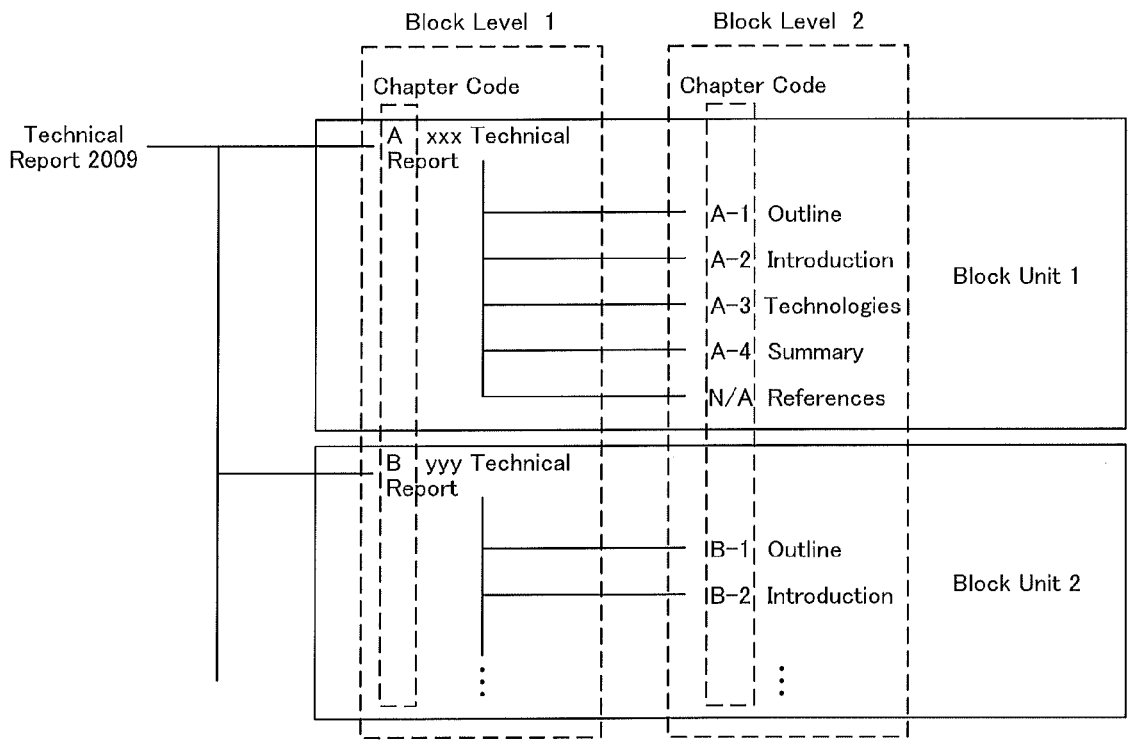
FIG. 8 is yet another view to explain how to divide one page into multiple block units.

As illustrated in FIG. 8, the blocking operation results in: the small block with the chapter code "A" and the chapter title "xxx Technical Report", which is organized at block level 1; the small block with the chapter code "A-1" and the chapter title "Outline", the small block with the chapter code "A-2" and the chapter title "Introduction", the small block with the chapter code "A-3" and the chapter title "Summary", and the small block with no chapter code and the chapter title "References", which are organized at block level 2 subordinate to block level 1; the small block with the chapter code "B" and the chapter title "yyy Technical Report", which is organized at block level 1; and the small block with the chapter code "B-1" and the chapter title "Outline" and the small block with the chapter code "B-2" and the chapter title "Introduction", which are organized at block level 2 subordinated to block level 1.

All the small blocks at block level 1, the most superordinate level, constitute a block unit. For example, the small blocks belong to multiple block units including the block units 1 and 2, as illustrated in FIG. 8.

If the document includes a contents page, it would be preferred to detect that page in advance to exclude that page from the target pages to be divided into small blocks, in order not to generate an image of the contents page as a thumbnail image. It may be judged that the document includes a contents page: if there is a certain keyword such as "contents", a list of itemized strings, or a series of page numbers, in the top region of a page coming next to the cover page or in the last few pages of the document. Alternatively, it may be judged so if some of the itemized strings are identical with some chapter titles detected from small blocks.

Hereinafter, the operation to detect the most likely relevant block unit, which is performed in Step S2, will be explained.

First of all, strings identical with registered information of the user currently operating the image processing apparatus 1 are detected from the document 100. Registered information of users may be composed of at least one of user name, business section, and personal identification information (personal ID); however, in this mode of implementation, that includes them all. The user currently operating the image processing apparatus 1 had been identified by user authentication when logged on the image processing apparatus 1. Registered information of users is stored in advance on a recording medium such as the memory 15, and registered information of the user currently operating the image processing apparatus 1 is read out from the recording medium in order to detect strings identical with the registered information from the document 100.

Figures 9, 10:
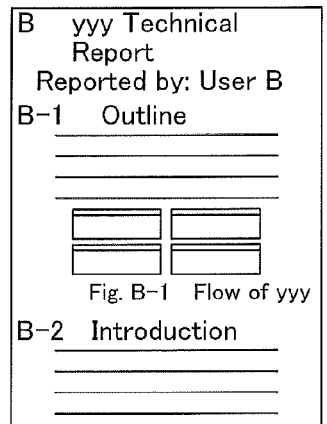
FIG. 9 is a table containing all identical strings with registered information of User B, which are picked up from a document.
FIG. 10 is a view illustrating generated thumbnail images.

Subsequently, the number of the strings detected is counted about every block unit. A block unit with the largest number among those counted is determined to be the most likely relevant block unit of the user currently operating the image processing apparatus 1. For example, as illustrated in FIG. 9, user name is "User B"; business section is "ppp Development Department"; personal ID is "A12345"; the number of strings detected is "1" about the block unit 1, "3" about the block unit 2, and "0" about the block unit 3. Based on the table, the block unit 2 with the chapter title "yyy Technical Report" is determined to be the most likely relevant block unit of User B.

In this mode of implementation, when determining the most likely relevant block unit of User B, the numbers of all the registered information objects: user name, business section, and personal ID are counted with the same weight value and evaluated based on their numbers counted. Alternatively, when determining the most likely relevant block unit of User B, the numbers of user name, business section, and personal ID may be counted with different weight values and evaluated based on their numbers counted.

As described above, a most likely relevant block unit of the user currently operating the image processing apparatus 1 is determined according to the number of strings identical with at least one of user name, business section, and personal ID of the user, which are detected from the document 100. This makes it possible to determine a most likely relevant block unit of the user precisely.

Hereinafter, the operation to detect objects for thumbnail images, which is performed in Step S3, and the thumbnail image generating operation of Step S4 will be explained.

Images and texts are detected from a first page of the most likely relevant block unit determined as described above. FIG. 10 illustrates a thumbnail image generated using the objects detected therefrom. In this mode of implementation, a small-sized image of the first page from the block unit 2 which is determined to be the most likely relevant block unit of User B is generated and this corresponds to the thumbnail image 101c to be presented to User B.

As described above, thumbnail images are generated using objects from the most likely relevant block unit of a user currently operating the image forming apparatus 1. This makes it possible to show right thumbnail images to a right user who can remember images included in the thumbnail images, and the user is allowed to recognize the content of the document as being familiar to him/herself, fairly easily.

Figure 11:
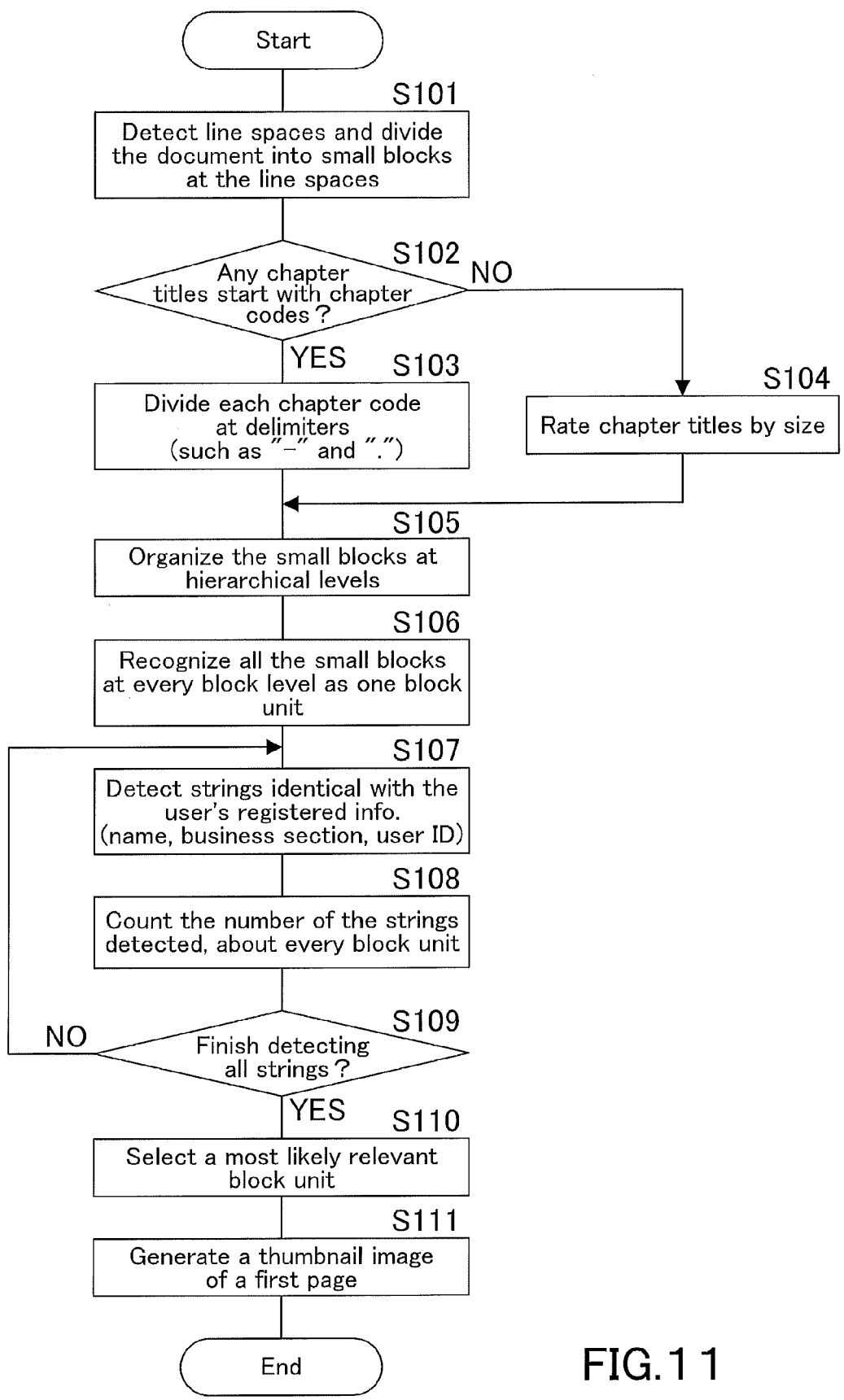
FIG. 11 is a flowchart to further explain the operations in the flowchart of FIG. 4 in detail.

FIG. 11 is a flowchart to further explain the operations in the flowchart of FIG. 4 in detail.

In Step S101, lines spaces are detected from the document 100 and the document 100 is divided into minimum blocks (small blocks) at the line spaces. Subsequently, it is judged in Step S102 whether or not there are any chapter codes with which chapter titles start. If there are such chapter codes (YES in Step S102), the chapter codes are separated from the chapter titles by delimiters such as hyphens and periods in Step S103, and then the processing routine proceeds to Step S105. If there are no such chapter codes (NO in Step S102), the chapter titles are rated by size in Step S104, and then the processing routine proceeds to Step S105.

The small blocks are organized at hierarchical levels in Step S105, and the small blocks organized at block level 1 constitute a block unit in Step S106.

Then, strings identical with registered information of the user are detected from the document 100 in Step S107, and the number of the strings detected is counted about every block unit in Step S108.

In Step S109, it is judged whether or not all strings identical with the registered information are completely detected from the file (document 100). If all such strings are not completely detected yet therefrom (NO in Step S109), the processing routine returns to Step S107. If all such strings are completely detected therefrom (YES in Step S109), a block unit with the largest number among those counted (largest number among the numbers of the strings detected) is determined to be the most likely relevant block unit of the user in Step S110.

In Step S111, an image of a first page of the most likely relevant block unit is generated as a thumbnail image.

[Mode of Implementation 2]

Figure 12:
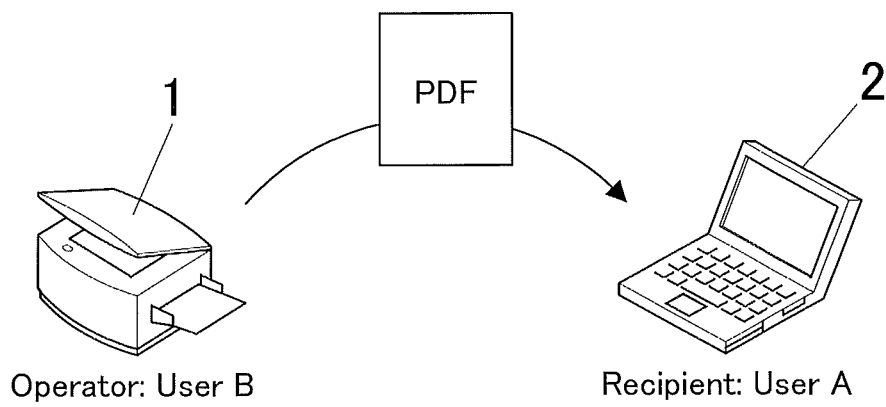
FIG. 12, which relates to another mode of implementing the present invention, is a view to explain how User B transmits a document from the image processing apparatus to the terminal used by User A.

In this mode of implementation, as illustrated in FIG. 12, User B transmits the document 100 including a thumbnail image, in PDF or another format, from the Box 151 of the memory 15 of the image processing apparatus 1 to the terminal 2 used by User A.

Figure 13:
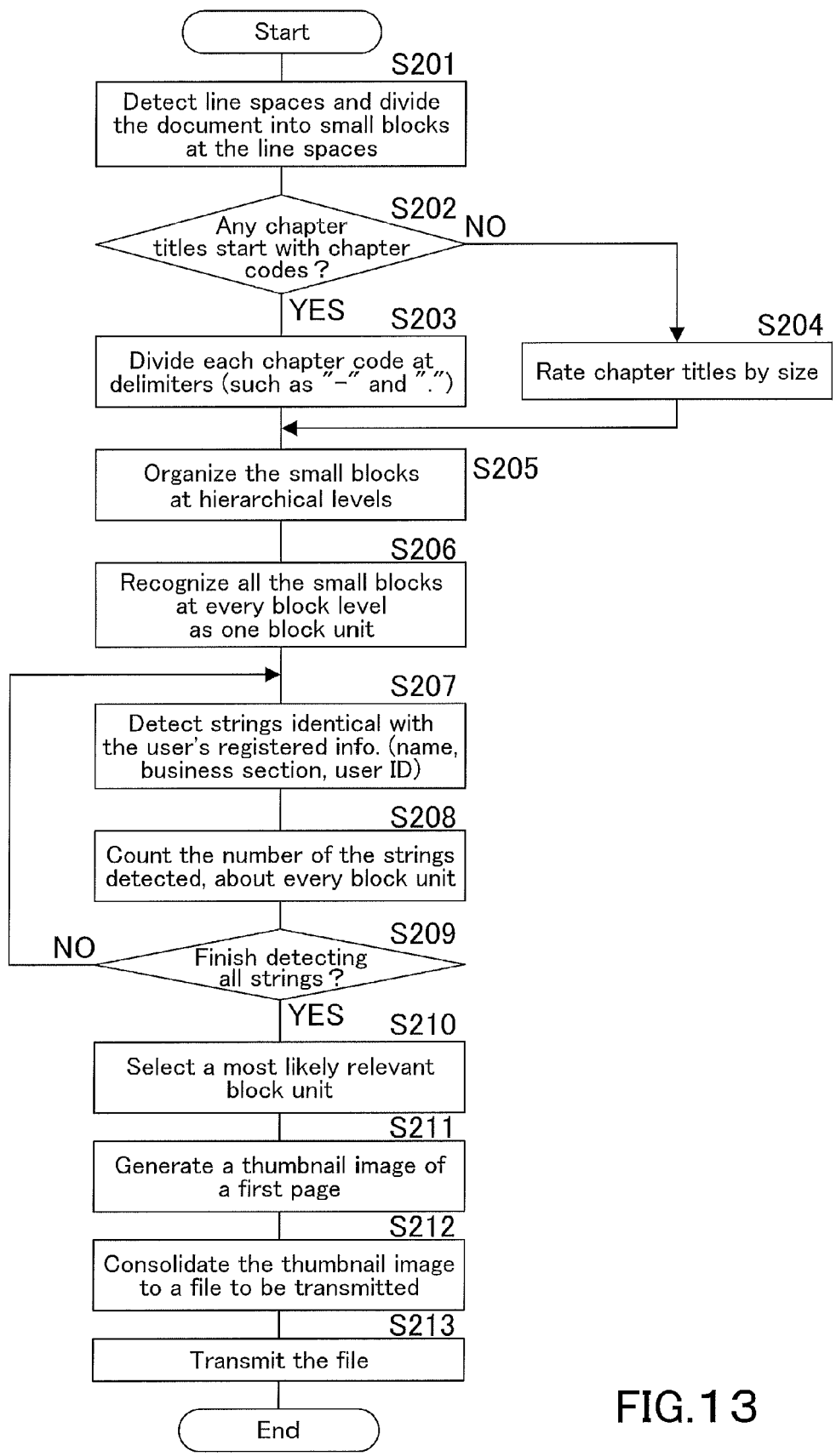
FIG. 13 is a flowchart representing a processing routine of the image processing apparatus.

FIG. 13 is a flowchart representing a processing routine of the image processing apparatus 1 in this mode of implementation.

Explanation of the operations of Steps S201 to S206 will be omitted hereinafter because they are identical with those of Steps S101 to S106 in FIG. 11. In this mode of implementation, User A, who is currently operating his/her own terminal to view thumbnail images, will receive the document 100. Similar to the Mode of Implementation 1, strings identical with registered information of User A are detected from the document 100 in Step S107, and the number of the strings detected is counted about each of the block units in Step S108. In Step S209, it is judged whether or not all strings identical with the registered information are completely detected from the file (document 100). If all such strings are not completely detected yet therefrom (NO in Step S209), the processing routine returns to Step S207. If all such strings are completely detected therefrom (YES in Step S209), a block unit with the largest number among those counted (largest number among the numbers of the strings detected) is determined to be the most likely relevant block unit of User A in Step S210.

Figures 14, 15:
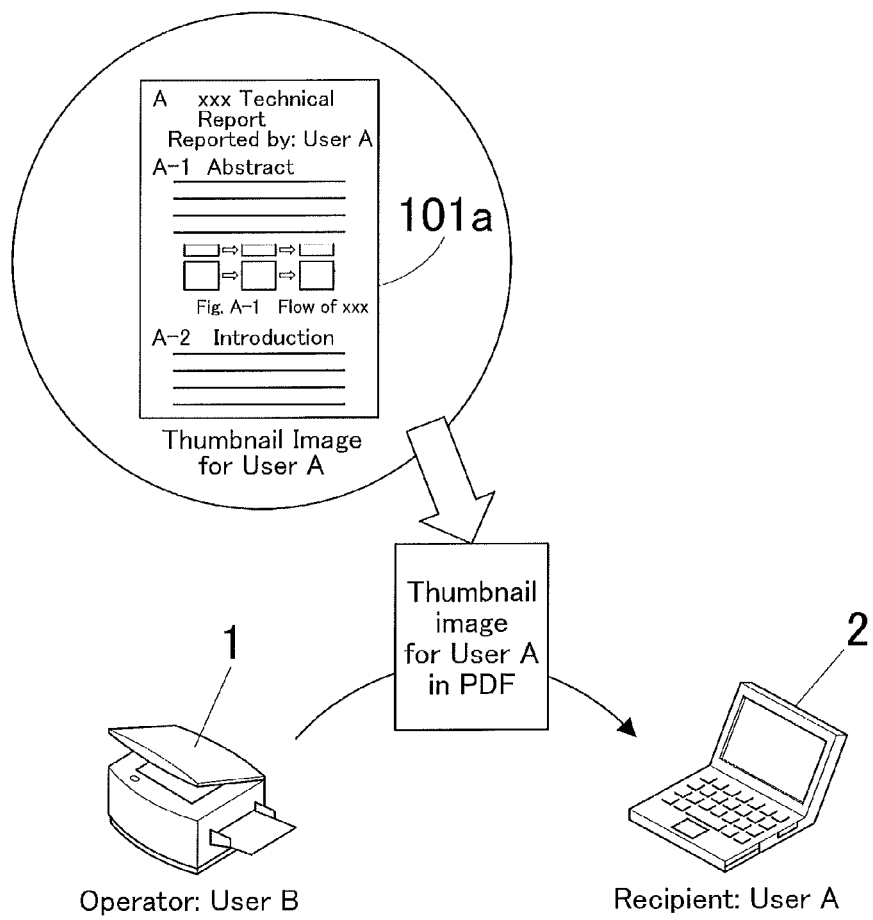
FIG. 14 is a table containing all identical strings with registered information of User A, which are picked up from a document.
FIG. 15 is a view to explain how User B transmits a document including thumbnail images from the image processing apparatus to the terminal used by User A.

For example, as illustrated in FIG. 14, user name is "User A"; business section is "ppp Development Department"; personal ID is "A12333"; the number of strings detected is "3" about the block unit 1, "1" about the block unit 2, and "0" about the block unit 3. Based on the table, the block unit 1 with the chapter title "yyy Technical Report" is determined to be the most likely relevant block unit of User A.

Also in this mode of implementation, when determining the most likely relevant block unit of User A, the numbers of user name, business section, and personal ID may be counted with different weight values and evaluated based on their numbers counted.

Back to FIG. 13, an image of a first page of the most likely relevant block unit of User A is generated as a thumbnail image in Step S211; the thumbnail image is consolidated to the file and the file is converted into PDF by a heretofore known method in Step S212. After that, the file is transmitted to User A in Step S213.

As described above and illustrated in FIG. 15, User B, who is currently operating the image processing apparatus 1, is allowed to transmit the document 100 including a thumbnail image 101a by e-mail or the like, to the terminal 2 used by User A.

Receiving the document 100 and viewing the thumbnail image 101a, User A is allowed to recognize the content of the document 100 as being familiar to him/herself, fairly easily.

[Mode of Implementation 3]

Figure 16:
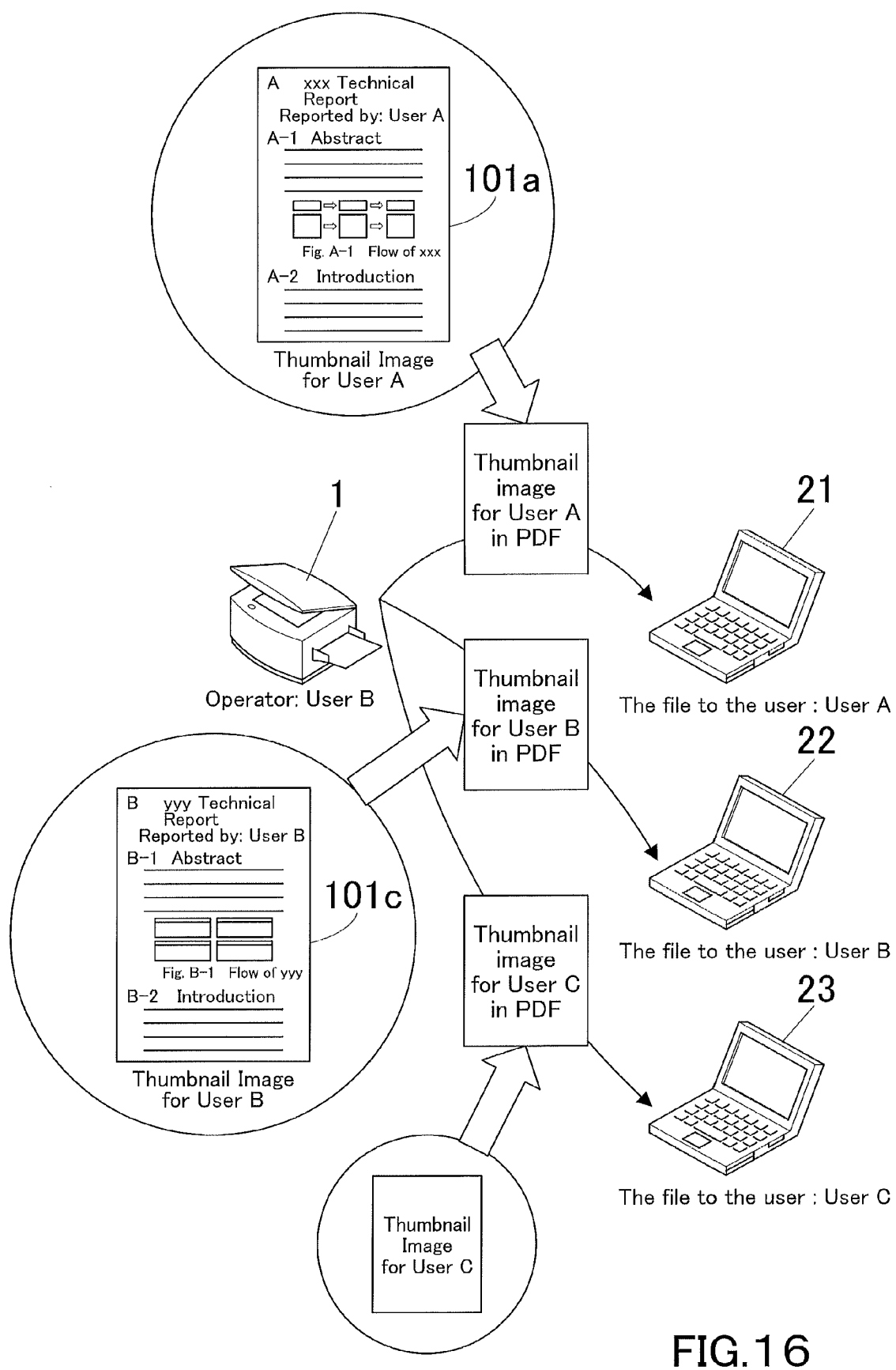
FIG. 16, which relates to yet another mode of implementing the present invention, is a view to explain how User B transmits a document including thumbnail images from the image processing apparatus to multiple users' terminals.

In this mode of implementation, as illustrated in FIG. 16, User B transmits the document 100 including a thumbnail image, in PDF or another format, from the Box 151 of the memory 15 of the image processing apparatus 1 to a plurality of terminals, the terminals 21, 22, 23 used by Users A, B, C, respectively.

Figure 17:
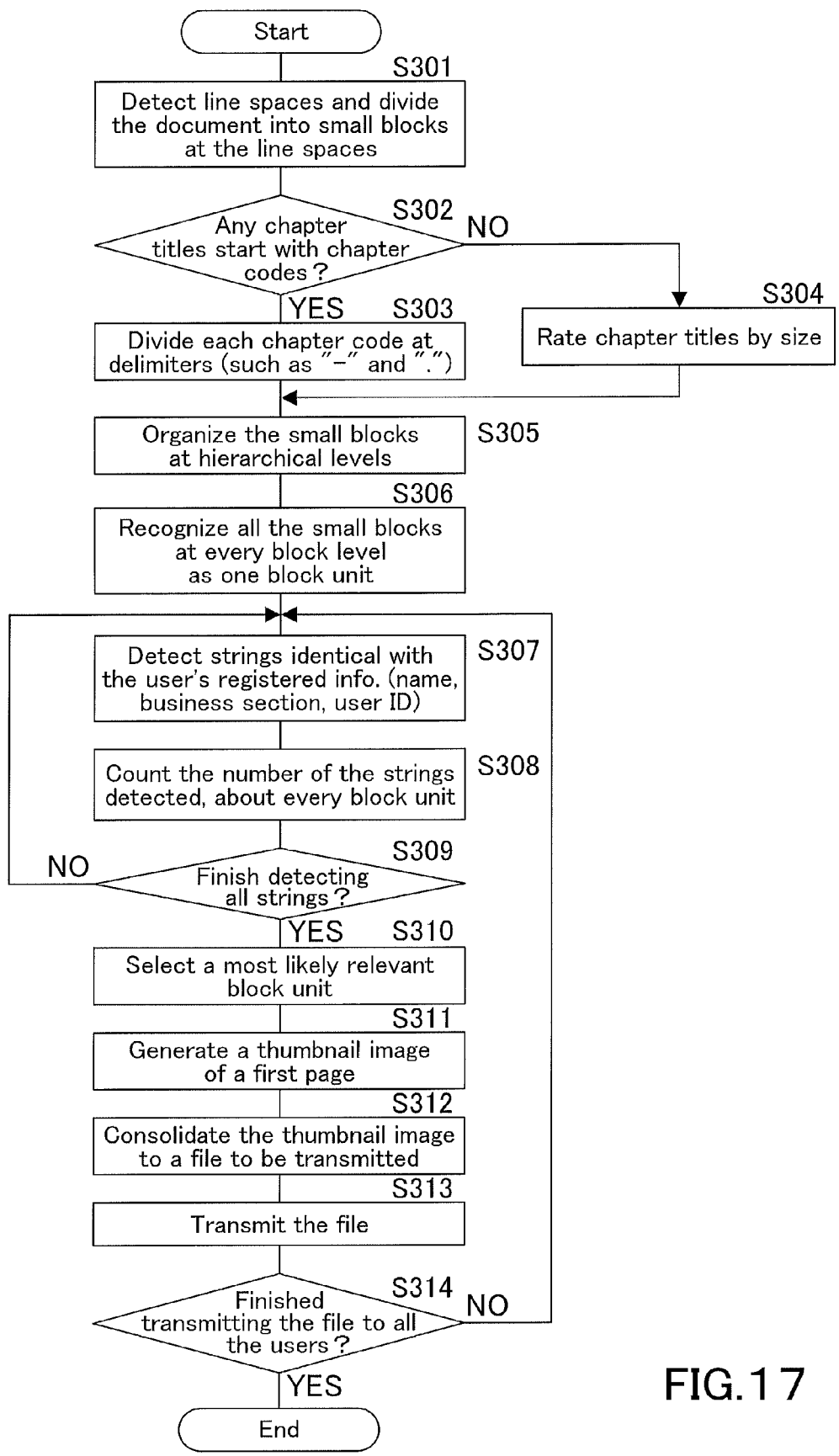
FIG. 17 is a flowchart representing a processing routine of the image processing apparatus.

FIG. 17 is a flowchart representing a processing routine of the image processing apparatus 1 in this mode of implementation.

Explanation of the operations of Steps S301 to S306 will be omitted hereinafter because they are identical with those of Steps S101 to S106 in FIG. 11.

In this mode of implementation, Users A, B, and C, who are currently operating their own terminals to view thumbnail images, will receive the document 100. Similar to the Modes of Implementation 1 and 2, strings identical with registered information of User A are detected from the document 100 in Step S307, and the number of the strings detected is counted about each of the block units in Step S308.

In Step S309, it is judged whether or not all strings identical with the registered information are completely detected from the file (document 100). If all such strings are not completely detected yet therefrom (NO in Step S309), the processing routine returns to Step S307. If all such strings are completely detected therefrom (YES in Step S309), a block unit with the largest number among those counted (largest number among the numbers of the strings detected) is determined to be the most likely relevant block unit of User A in Step S310.

Subsequently, an image of a first page of the most likely relevant block unit of User A is generated as a thumbnail image in Step S311; the thumbnail image is consolidated to the file and the file is converted into PDF by a heretofore known method in Step S312. After that, the file is transmitted to User A in Step S313.

In Step S314, it is judged whether or not the document 100 has been transmitted to all of Users A, B, and C. If it has not been transmitted to all of them (NO in Step S314), the processing routine returns to Step S307 in order to perform the same operations as described above about User B, and User C after User B. If the document 100 has been transmitted to all of them (YES in Step S314), the processing routine terminates.

Receiving the document 100 and viewing their own thumbnail images, Users A, B, and C are allowed to recognize the content of the document 100 as being familiar to themselves, fairly easily.

[Mode of Implementation 4]

Hereinafter will be described, in this mode of implementation, another example of a thumbnail image generating operation to be performed after determining a most likely relevant block unit of the user currently operating the image processing apparatus 1 to view thumbnail images. In this mode of implementation, images are detected from the most likely relevant block unit, priority levels are given to the images, an image at the highest priority level is selected therefrom, and then a thumbnail image is generated.

Figures 18A, 18B, 18C:
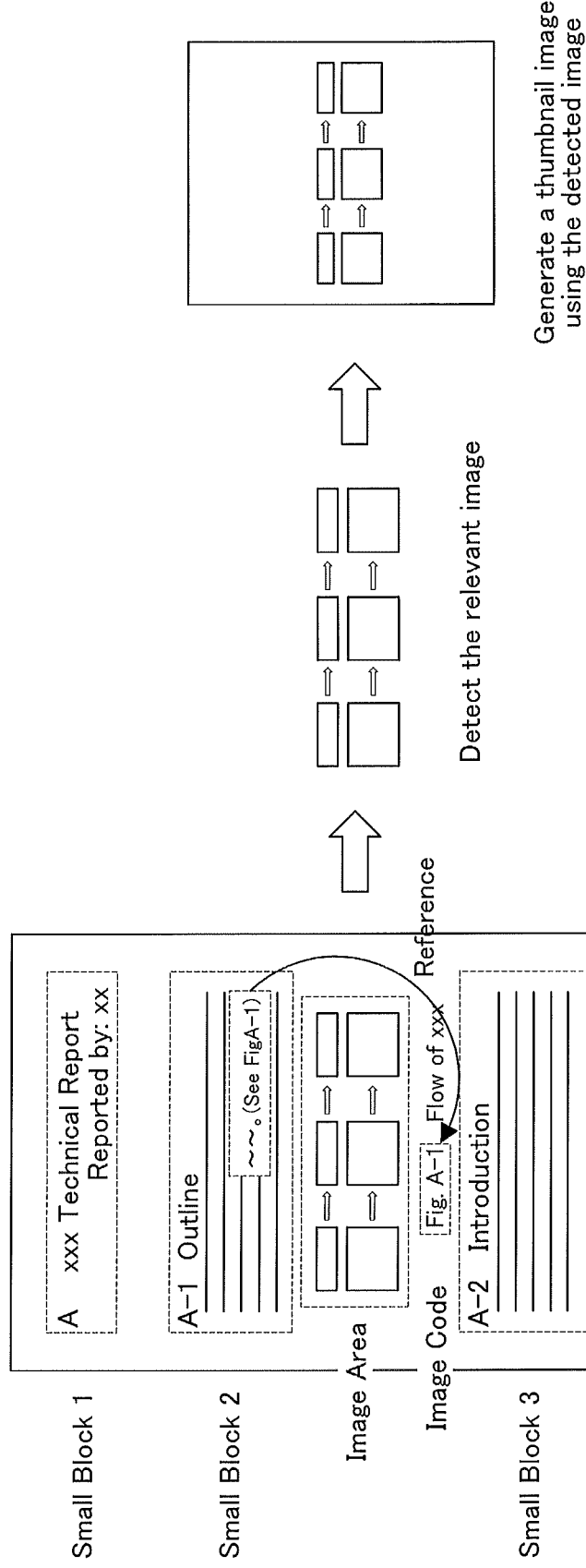
FIG. 18, which relates to still yet another mode of implementing the present invention, is a view illustrating a variation of the thumbnail image generating operation.

More specifically, as illustrated in FIG. 18a, an image area is detected from the most likely relevant block unit by a heretofore known method, and an image code (for example, Fig. A-1) is further detected from the vicinity of the image area. Furthermore, a part referring to the image code is detected from the most likely relevant block unit. For example, as indicated by an arrow in FIG. 18a, there is a part referring to the image code in the small block 2, which is a text area.

Subsequently, the small block 2 is examined and it is judged if it is a text area corresponding to "Outline/Overview", "Summary/Conclusion", or other sections of the document. The judgment depends on whether or not the small block 2 includes any of the strings "Outline", "Overview", "Summary", "Conclusion", and the like.

The small block of "Outline of Overview", the small block of "Summary/Conclusion", and the small blocks of the other sections of the document, in this order, are set in advance at descending priority levels. And the image area to which the small block at the highest priority level refers is detected as illustrated in FIG. 18b, and a thumbnail image is generated as illustrated in FIG. 18c. More specifically, if the most likely relevant block unit includes a plurality of images which are referred to by different small blocks, it would be very convenient to give priority levels to small blocks in order to generate a right thumbnail image for the user to view a thumbnail image.

If the most likely relevant block unit includes a plurality of images which are referred to by one small block; or if the most likely relevant block unit includes a plurality of images which are referred to by a small block of a section other than "Outline/Overview" and "Summary/Conclusion", it would be very convenient to sort the images by a heretofore known method in the following categories: drawing, table (including chart), and photo which, in this order, are set in advance at descending priority levels. This makes it possible to generate thumbnail images of the images from one of these categories: drawing, table, and photo, in the order of preference.

Figure 19:
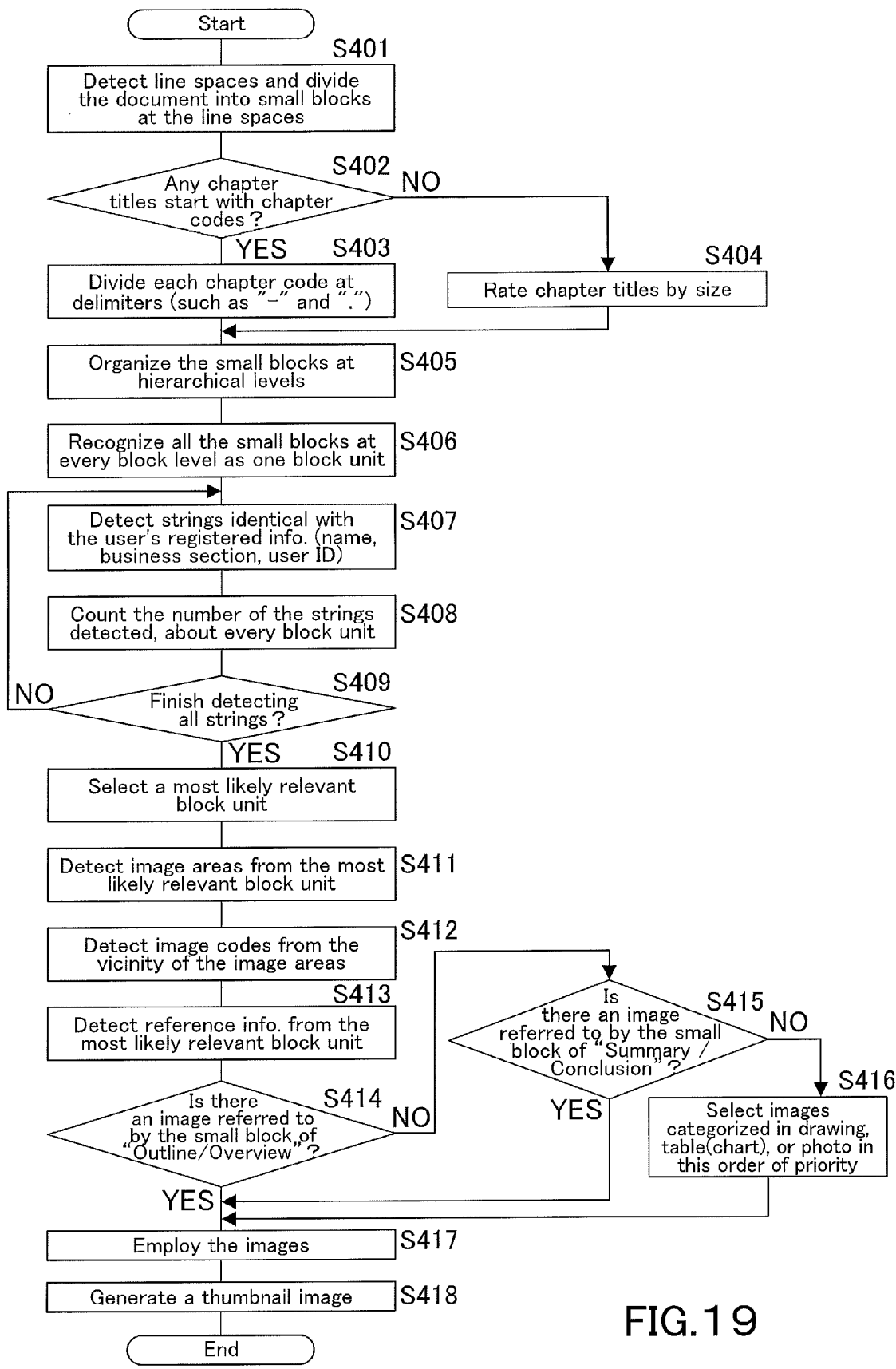
FIG. 19 is a flowchart representing a processing routine of the image processing apparatus.

FIG. 19 is a flowchart representing a processing routine of the image processing apparatus 1 to give priority levels to images, select an image at the highest priority level, and generate a thumbnail image, in the Mode of Implementation 4.

Explanation of the operations of Steps S401 to S406 will be omitted hereinafter because they are identical with those of Steps S101 to S106 in FIG. 11.

Then, strings identical with registered information of the user are detected from the document 100 in Step S407, and the number of the strings detected is counted about every block unit in Step S408.

In Step S409, it is judged whether or not all strings identical with the registered information are completely detected from the file (document 100). If all such strings are not completely detected yet therefrom (NO in Step S409), the processing routine returns to Step S407. If all such strings are completely detected therefrom (YES in Step S409), a block unit with the large number among those counted (largest number among the numbers of the strings detected) is determined to be the most likely relevant block unit of the user in Step S410.

Subsequently, image areas are detected from the most likely relevant block unit in Step S411, and image codes are further detected from the vicinity of the image areas in Step S412.

Reference information of the images is detected from the small blocks in Step S413, and it is judged in Step S414 whether or not there is an image referred to by the small block of "Outline/Overview".

If there is an image referred to by the small block of "Outline/Overview" (YES in Step S414), this image is determined as a thumbnail image for the user in Step S417. If there is not an image referred to by the small block of "Outline/Overview" (NO in Step S414), then it is judged in Step S415 whether or not there is an image referred to by the small block of "Summary/Conclusion".

If there is an image referred to by the small block of "Summary or Outline" (YES in Step S415), this image is employed as a thumbnail image for the user in Step S417. If there is not an image referred to by the small block of "Summary or Outline" (NO in Step S415), images categorized in drawing, table, or photo in this order of priority are selected in Step S416, and the image at the highest priority level is employed as a thumbnail image for the user in Step S417.

And then, a thumbnail image is generated in Step S418.

The image to be employed as a thumbnail image preferentially is not limited to the examples given above. Instead, it may be the image with the largest hue distribution, the image with the largest lightness distribution, the image in the largest size, or the like.

[Mode of Implementation 5]

Hereinafter will be described, in this mode of implementation, yet another example of a thumbnail image generating operation to be performed after determining the most likely relevant block unit of the user currently operating the image processing apparatus 1 to view thumbnail images.

Figure 20:
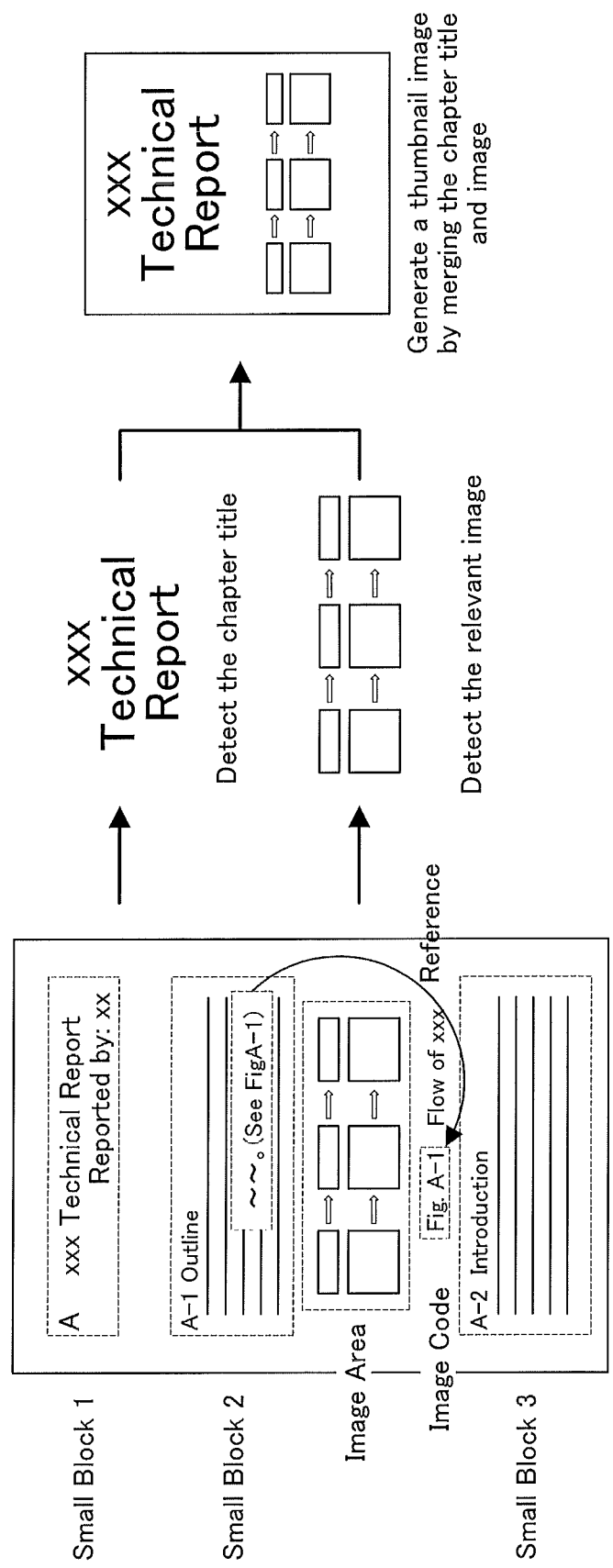
FIG. 20, which relates to still yet another mode of implementing the present invention, is a view illustrating another variation of the thumbnail image generating operation.

In this mode of implementation, while an image at the highest priority level is employed as a thumbnail image as described above in the Mode of Implementation 4, a chapter title from the most likely relevant block unit is further employed as illustrated in FIG. 20a. For example, the chapter title "xxx Technical Report" is detected from the document, as illustrated in FIG. 20b. And a thumbnail image is generated by merging the image employed as a thumbnail image and the chapter title detected from the document 100, as illustrated in FIG. 20c.

Figure 21:
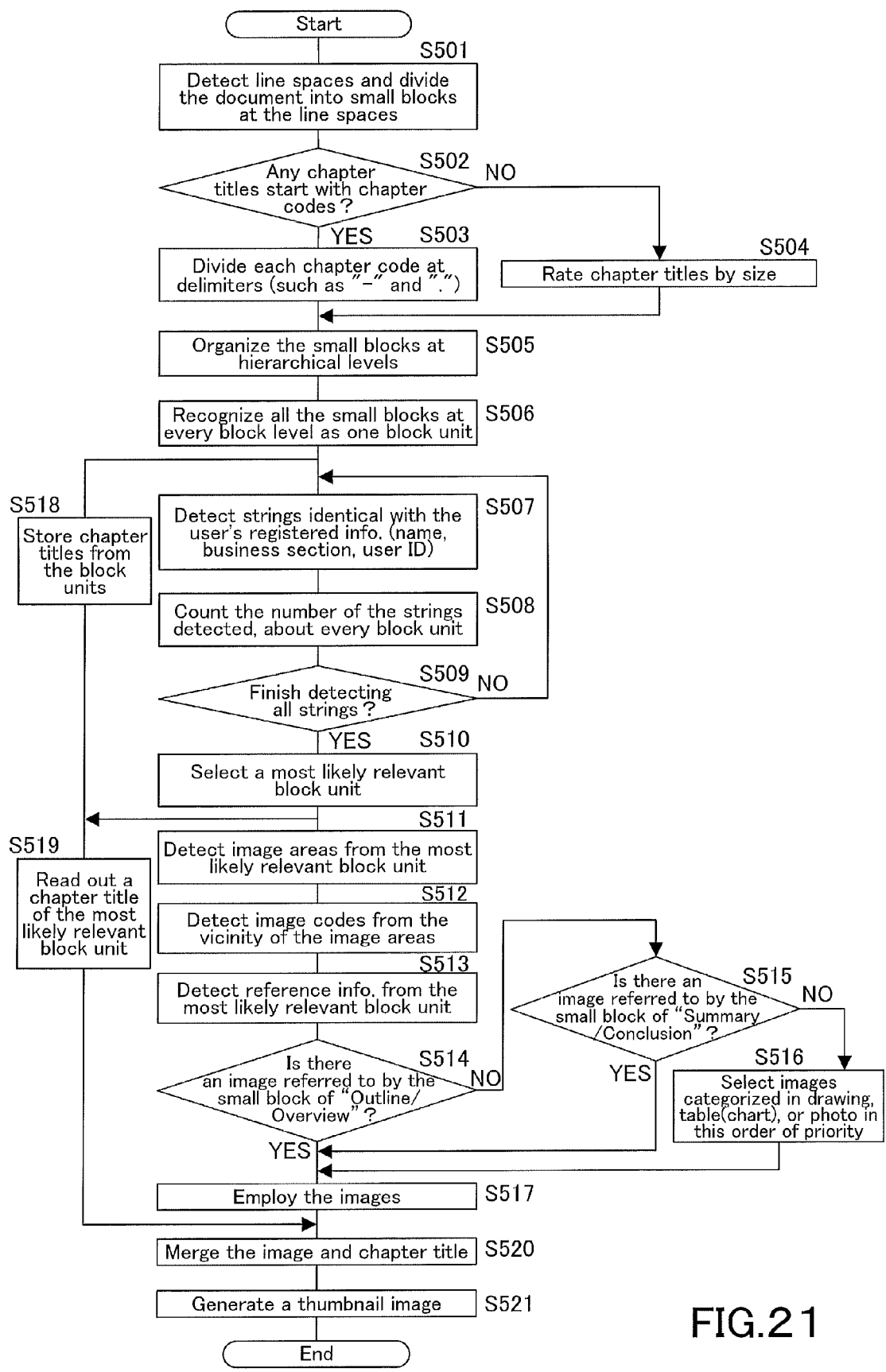
FIG. 21 is a flowchart representing a processing routine of the image processing apparatus.

FIG. 21 is a flowchart representing a processing routine of the image processing apparatus 1 in this mode of implementation.

Explanation of the operations of Steps S501 to S506 will be omitted hereinafter because they are identical with those of Steps S101 to S106 in FIG. 11.

Strings identical with registered information of the user are detected from the document 100 in Step S507, and the number of the strings detected is counted about every block unit in Step S508.

In Step S509, it is judged whether or not all strings identical with the registered information are completely detected from the file (document 100). If all such strings are not completely detected yet therefrom (NO in Step S509), the processing routine returns to Step S507. If all such strings are completely detected therefrom (YES in Step S509), a block unit with the largest number among those counted (largest number among the numbers of the strings detected) is determined to be the most likely relevant block unit of the user in Step S510.

Subsequently, image areas are detected from the most likely relevant block unit in Step S511, and image codes are further detected from the vicinity of the image areas in Step S512.

Reference information of the images is detected from the small blocks in Step S513, and it is judged in Step S514 whether or not there is an image referred to by the small block of "Outline/Overview".

If there is an image referred to by the small block of "Outline/Overview" (YES in Step S514), this image is employed as a thumbnail image for the user in Step S517. If there is not an image referred to by the small block of "Outline/Overview" (NO in Step S514), then it is judged in Step S515 whether or not there is an image referred to by the small block of "Summary/Conclusion".

If there is an image referred to by the small block of "Summary or Outline" (YES in Step S515), this image is employed as a thumbnail image for the user in Step S517. If there is not an image referred to by the small block of "Summary or Outline" (NO in Step S515), images are categorized in drawing, table, and photo in this order of priority in Step S516, and the image at the highest priority level is employed as a thumbnail image for the user in Step S517.

The chapter titles from the block units obtained by the blocking operation of Steps S501 through S506 are stored on a recording medium such as the RAM 13 or the memory 15 in Step S518, and a chapter title from the most likely relevant block unit determined in Step S510 is read out therefrom in Step S519.

And then, the image employed in Step S517 and the chapter title of the most likely relevant block unit read out in Step S519 are merged together in Step S520, and a thumbnail image is generated in Step S521.

As described above, a thumbnail image is generated by merging an image and a chapter title together in one image. Thus the user currently operating the image processing apparatus 1 is allowed to recognize the content of the document as being familiar to him/herself, fairly easily.

[Mode of Implementation 6]

In this mode of implementation, a log indicating the keywords by which the document 100 (file) has been searched for is stored in advance about every user, strings identical with the keywords are detected from the entire document 100, and a most likely relevant block unit is determined according to the number of the strings detected.

Figure 22:
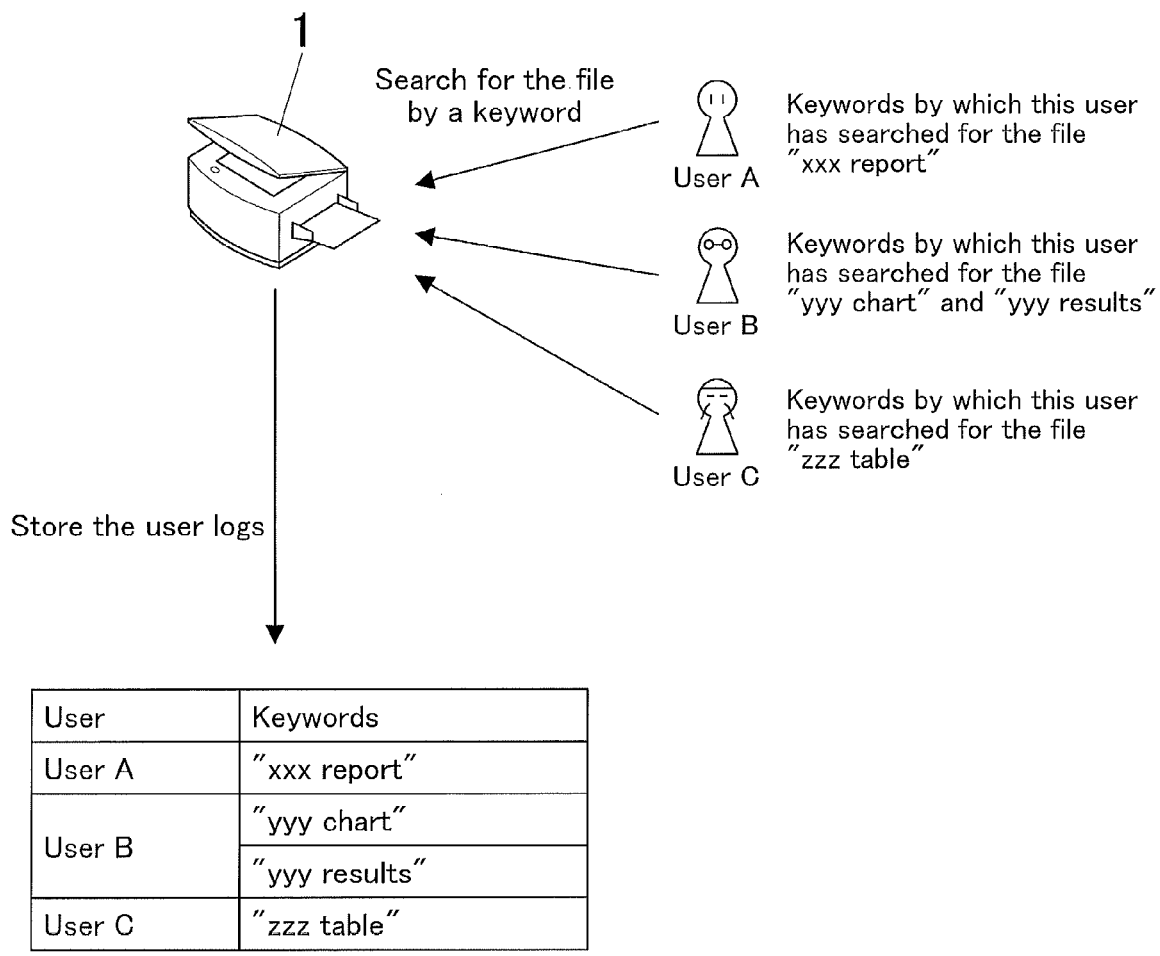
FIG. 22, which relates to still yet another mode of implementing the present invention, is a view to explain the following operations: picking up from a document, all identical strings with keywords by which User A and User B have searched for the document previously; and selecting block units most connected to User A and User B based on how many strings have been picked up, respectively.

For example, User A has searched a file in a Box of the image processing apparatus 1 by the keyword "xxx report"; User B has searched a file in a Box of the image processing apparatus 1 by the keywords "yyy chart" and "yyy results"; and User C has searched a file in a Box of the image processing apparatus 1 by the keyword "zzz table". FIG. 22 is a table containing these users' logs, which is stored on a recording medium such as the memory 15.

A most likely relevant block unit of the user currently operating the image processing apparatus 1 to view thumbnail images is determined based on the keywords that he/she has used for file search.

Specifically, strings identical with the keywords are detected from the entire document 100, and the number of the strings detected is counted. A block unit with the largest number among those counted is determined to be the most likely relevant block unit of the user, and a reduced image of a first page of the most likely relevant block unit is generated as a thumbnail image.

Figure 23:
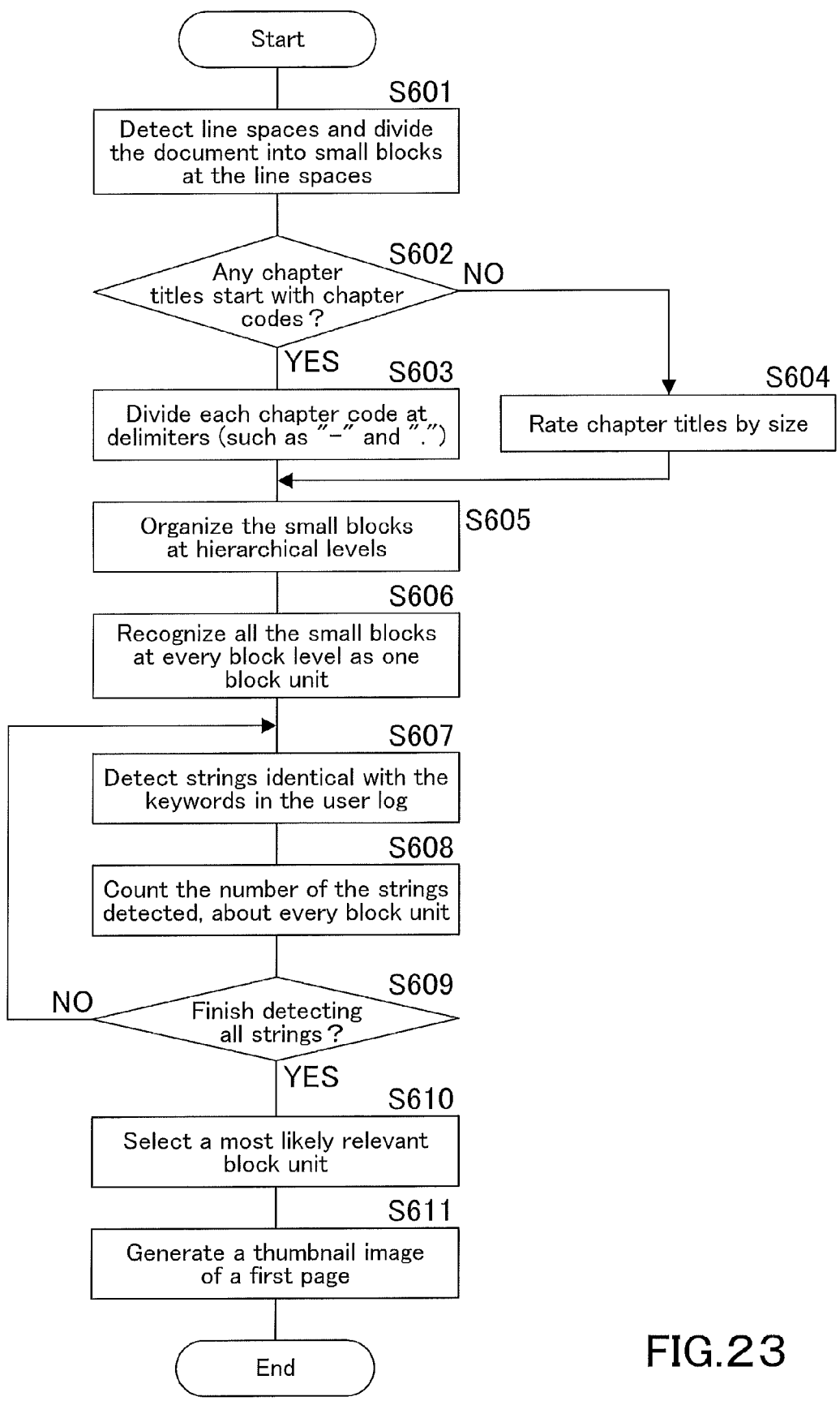
FIG. 23 is a flowchart representing a processing routine of the image processing apparatus.

FIG. 23 is a flowchart representing a processing routine of the image processing apparatus 1 in this mode of implementation.

Explanation of the operations of Steps S601 to S606 will be omitted hereinafter because they are identical with those of Steps S101 to S106 in FIG. 11.

Strings identical with the strings (keywords) in the user's file search log are detected from the document 100 in Step S607, and the number of the strings detected is counted about every block unit in Step S608.

In Step S609, it is judged whether or not all strings identical with the keywords are completely detected from the file (document 100). If all such strings are not completely detected yet therefrom (NO in Step S609), the processing routine returns to Step S607. If all such strings are completely detected therefrom (YES in Step S609), a block unit with the largest number among those counted (largest number among the numbers of the strings detected) is determined to be the most likely relevant block unit of the user in Step S610.

In Step S611, an image of a first page of the most likely relevant block unit is generated as a thumbnail image.

As described above, a most likely relevant block unit of the user currently operating the image processing apparatus 1 is determined according to the number of the keywords by which the document 100 is searched for by the user. This makes it possible to determine a most likely relevant block unit of the user precisely.

[Mode of Implementation 7]

In this mode of implementation, a preview period by page for which the document 100 has been previewed are stored in advance about every user; a total preview period is counted about every block unit; a most likely relevant block unit is determined according to the total preview period.

Figure 24:
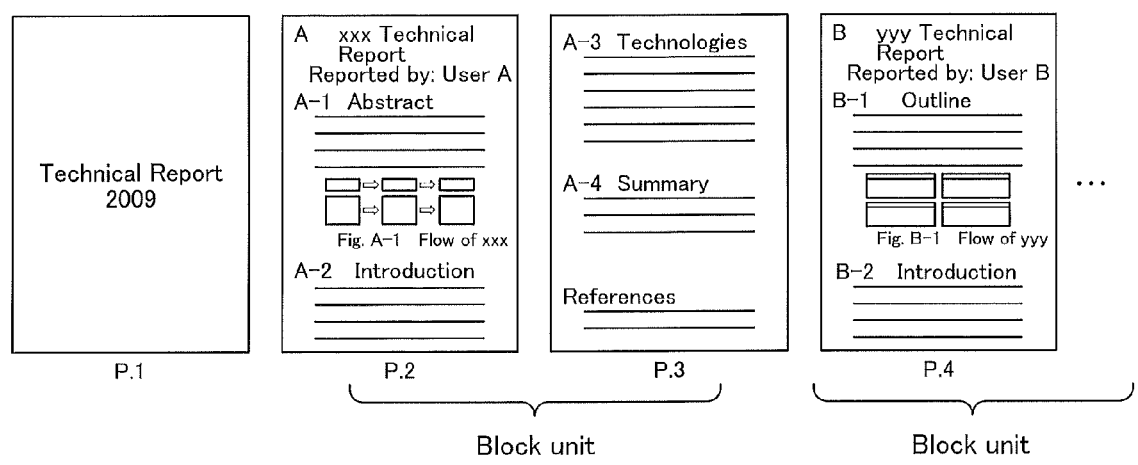
FIG. 24, which relates to still yet another mode of implementing the present invention, is a view to explain the following operation: determining block units most connected to User A and User B based on how long User A and User B previewed them, respectively.

For example, as illustrated in FIG. 24, Pages 1, 2, 3, and 4 of the document 100 have been previewed by User A for the total preview periods of: 2, 10, 8, and 3 seconds, respectively; and the same have been previewed by User B for the total preview periods of: 3, 3, 1, and 9 seconds, respectively. FIG. 24 is a table containing these logs, stored on a recording medium such as the memory 15.

A most likely relevant block unit of the user currently operating the image processing apparatus 1 to view thumbnail images is determined according to his/her total preview period.

Specifically, a user's total preview period by block unit is calculated based on the user's log of preview periods. For example, as for User A, there are block units with the total preview periods of 18 seconds and 5 seconds, and a block unit with the preview period of 18 seconds and the chapter title "xxx Technical Report" is determined to be a most likely relevant block unit of User A. As for User B, there are block units with the total preview periods of 4 seconds and 16 seconds, and a block unit with the preview period of 16 seconds and the chapter title "yyy Technical Report" is determined to be the most likely relevant block unit of User B.

Figure 25:
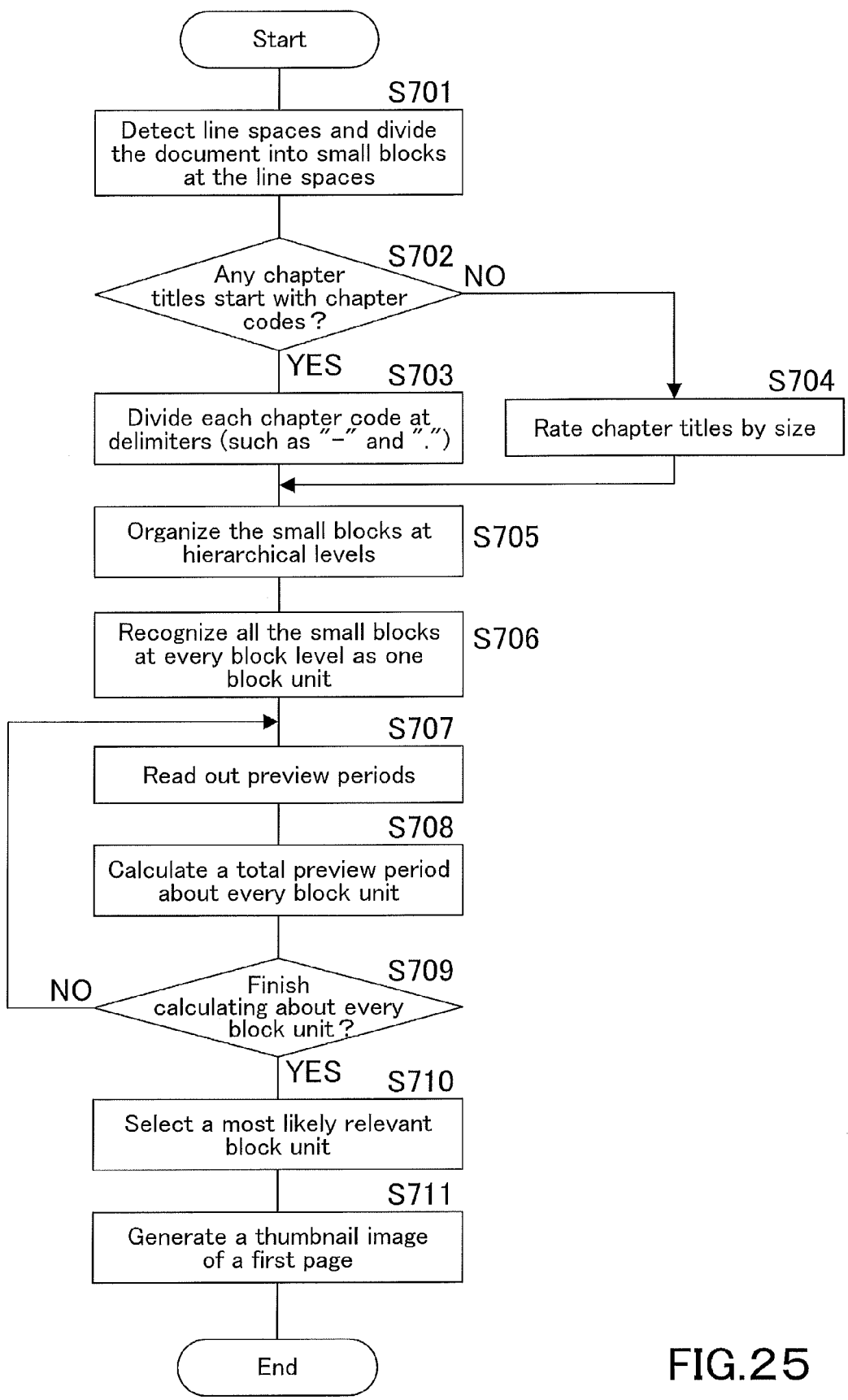
FIG. 25 is a flowchart representing a processing routine of the image processing apparatus.

FIG. 25 is a flowchart representing a processing routine of the image processing apparatus 1 in this mode of implementation.

Explanation of the operations of Steps S701 to S706 will be omitted hereinafter because they are identical with those of Steps S101 to S106 in FIG. 11.

The user's log indicating a preview period for which the document 100 has been previewed is read out from the memory 15 about every page in Step S707, and a total preview period is calculated about every block unit in Step S708.

In Step S709, it is judged whether or not calculating a total preview period about every block unit is finished. If it is not finished yet (NO in Step S709), the processing routine returns to Step S707. If calculating a total preview period about every block unit is finished (YES in Step S709), a block unit with the largest total preview period obtained is determined to be the most likely relevant block unit of the user in Step S710.

In Step S711, an image of a first page of the most likely relevant block unit is generated as a thumbnail image.

A most likely relevant block unit of the user may be determined based on the user's log stored in advance, indicating a preview period for which the document has been previewed, about every predetermined area, for example every small block, instead of every page.

As described above, a most likely relevant block unit of the user currently operating the image processing apparatus 1 is determined according to the preview period for which the document 100 has been previewed by the user. This makes it possible to determine a most likely relevant block unit of the user precisely.

[Mode of Implementation 8]

In this mode of implementation, the number of times by page the document 100 has been printed is stored in advance about every user, the largest number among those stored is obtained about every block unit, and a block unit with the largest number among the largest numbers obtained is determined to be the most likely relevant block unit.

Figure 26:
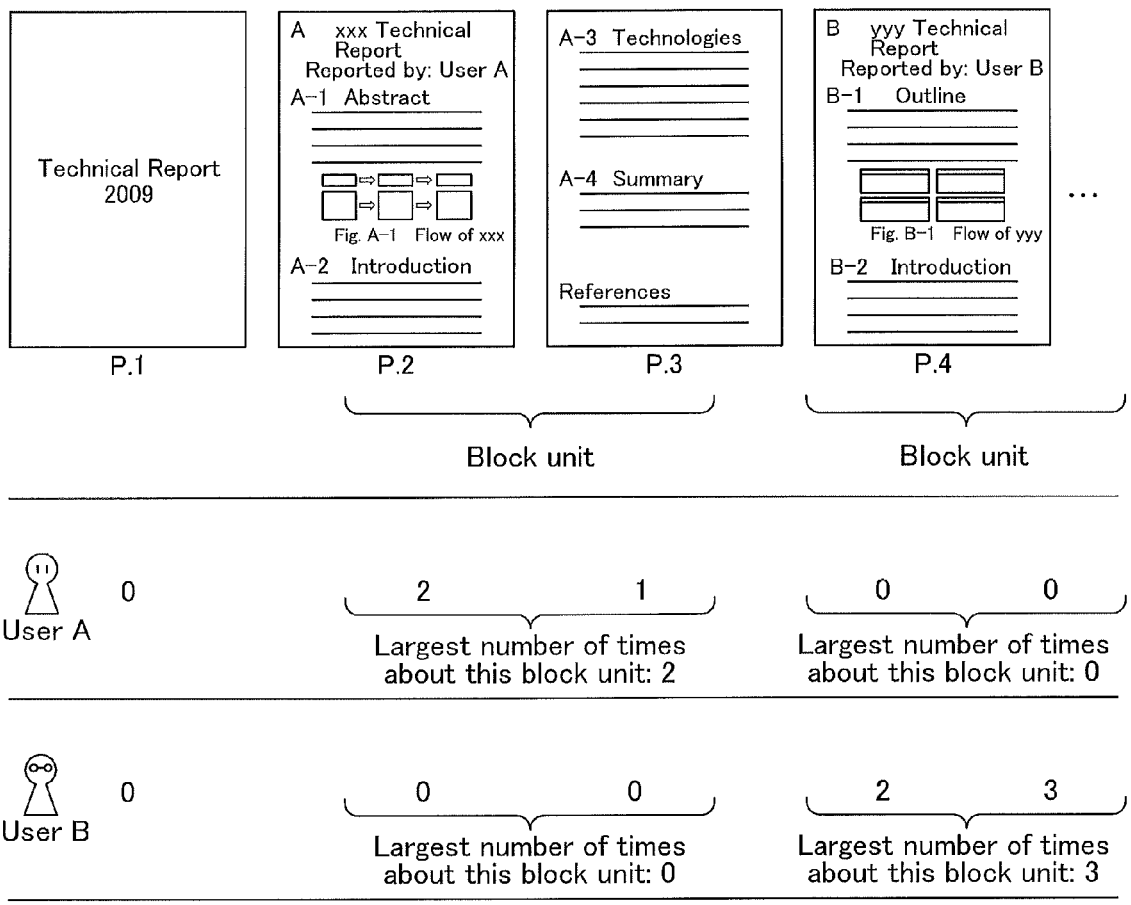
FIG. 26, which relates to still yet another mode of implementing the present invention, is a view to explain the following operation: determining block units most connected to User A and User B based on how many times User A and User B have printed them out, respectively.

For example, as illustrated in FIG. 26, the number of times the document 100 has been printed by User A is: 0, 2, 1, 0, 0 about Pages 1 to 5, respectively, and the number of times the document 100 has been printed by User B is: 0, 0, 0, 2, 3 about Pages 1 to 5, respectively. As for User A, there are block units with the largest numbers, 2 and 0, and a block unit with the largest number among the largest numbers obtained, 2 and with the chapter title "xxx Technical Report" is determined to be the most likely relevant block unit of User A. As for User B, there are block units with the largest numbers, 0 and 3, and a block unit with the largest number among the largest numbers obtained, 3 and with the chapter title "yyy Technical Report" is determined to be the most likely relevant block unit of User B.

Figure 27:
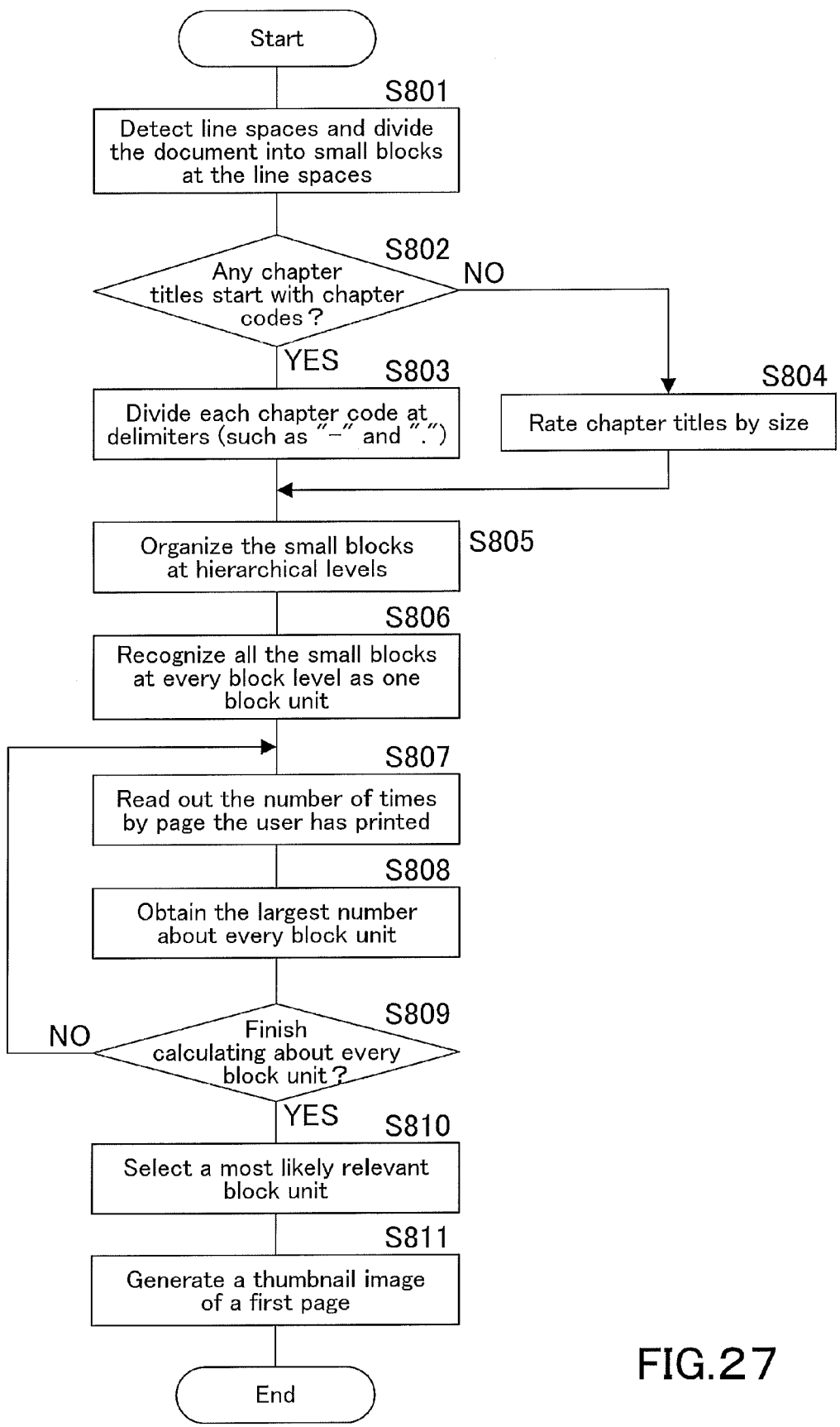
FIG. 27 is a flowchart representing a processing routine of the image processing apparatus.

FIG. 27 is a flowchart representing a processing routine of the image processing apparatus 1 in this mode of implementation.

Explanation of the operations of Steps S801 to S806 will be omitted hereinafter because they are identical with those of Steps S101 to S106 in FIG. 11.

The user's log indicating the number of times by page the document 100 has been printed is read out from the memory 15 in Step S807, and the largest number among them is obtained about every block unit in Step S808.

In Step S809, it is judged whether or not the largest number is obtained about every block unit. If the largest number is not obtained yet about every block unit (NO in Step S809), the processing routine returns to Step S807. If the largest number is obtained about every block unit (YES in Step S809), a block unit with the largest number among the largest numbers obtained is determined to be the most likely relevant block unit of the user in Step S810.

In Step S811, an image of a first page of the most likely relevant block unit is generated as a thumbnail image.

In this mode of implementation, the number of times by page the document has been printed is stored in advance, the largest number among those stored is obtained about every block unit, and a block unit with the largest number among the largest numbers obtained is determined to be the most likely relevant block unit. Alternatively, the number of times by page the document has been printed may be stored in advance, a sum of these numbers may be calculated about every block unit, and a block unit with the largest sum among those calculated may be determined to be the most likely relevant block unit.

A most likely relevant block unit of the user may be determined based on the log stored in advance, indicating the number of times by predetermined area such as small block, instead of page, the document has been printed.

As described above, a most likely relevant block unit of the user currently operating the image processing apparatus 1 is determined according to the number of times the document 100 has been printed by the user. This makes it possible to determine a most likely relevant block unit of the user precisely.

[Mode of Implementation 9]

In this mode of implementation, a log indicating new names to which the name of the document 100 has been changed is stored in advance about every user, strings identical with the new names are detected from the entire document 100, and a most likely relevant block unit is determined according to the total number of the strings detected.

Figure 28:
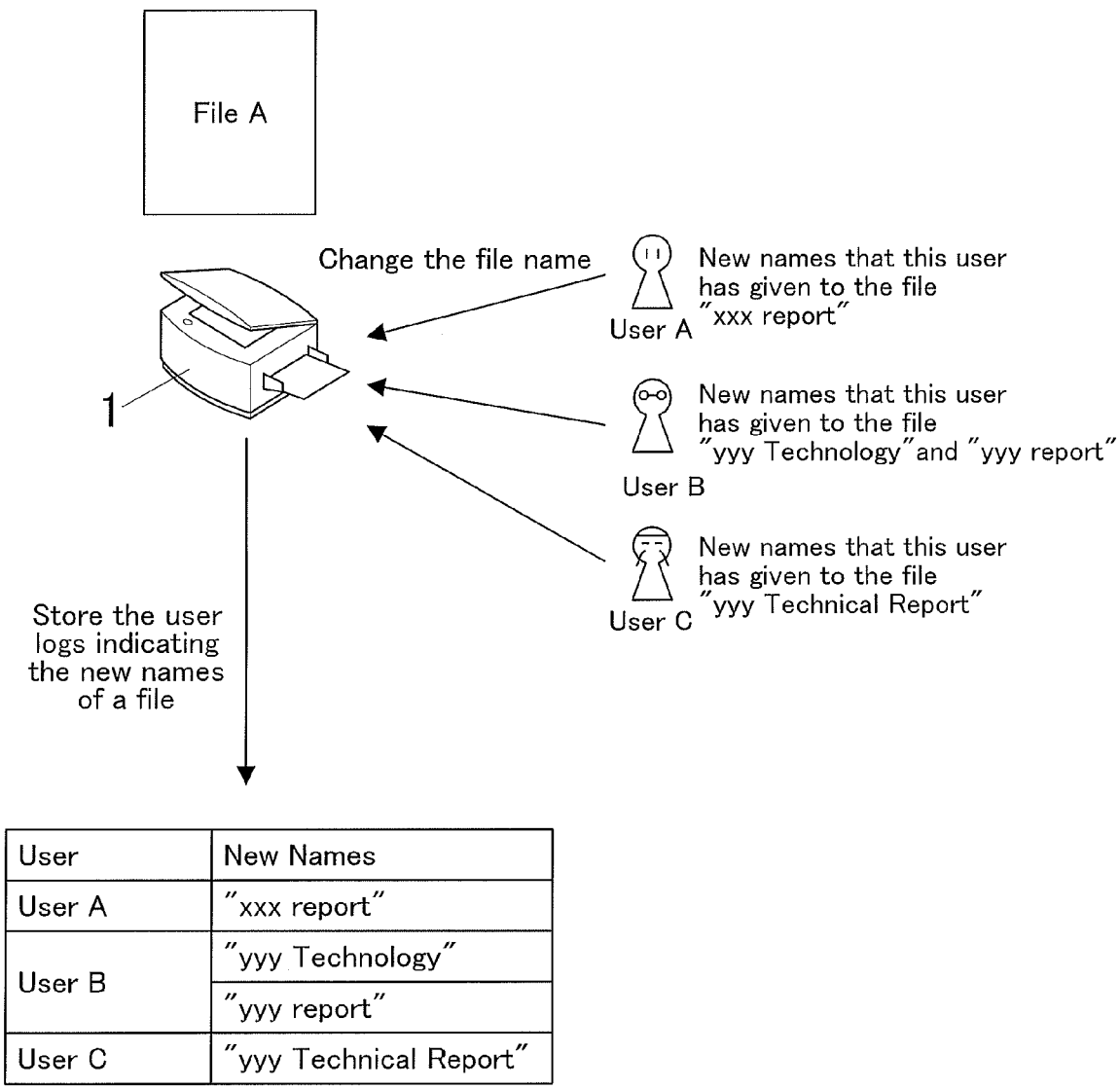
FIG. 28, which relates to still yet another mode of implementing the present invention, is a view to explain the following operations: picking up from a document, all identical strings with new names to which User A and User B have changed the name of the document previously; and selecting block units most connected to User A and User B based on how many strings have been picked up, respectively.

For example, as illustrated in FIG. 28, User A has changed the name of the document 100 to "xxx Report" to store on a recording medium such as a Box 151 of the memory 15 of the image processing apparatus 1; User B has changed the name of the document 100 to "yyy Technology" and "yyy Report" to store on a recording medium such as the Box 151; and User C has changed the name of the document 100 to "zzz Technical Report" to store on a recording medium such as the Box 151. FIG. 28 is a table containing these logs, stored on a recording medium such as the memory 15.

A most likely relevant block unit of the user currently operating the image processing apparatus 1 to view thumbnail images is determined based on the strings corresponding to the new names having been entered as the name of the document 100.

Specifically, strings identical with the new names to which the name of the document 100 has been changed are detected from the entire document 100, and the number of the strings detected is counted about every block unit. A block unit with the largest number among those counted is determined to be the most likely relevant block unit of the user, and a reduced image of a first page of the most likely relevant block unit is generated as a thumbnail image.

Figure 29:
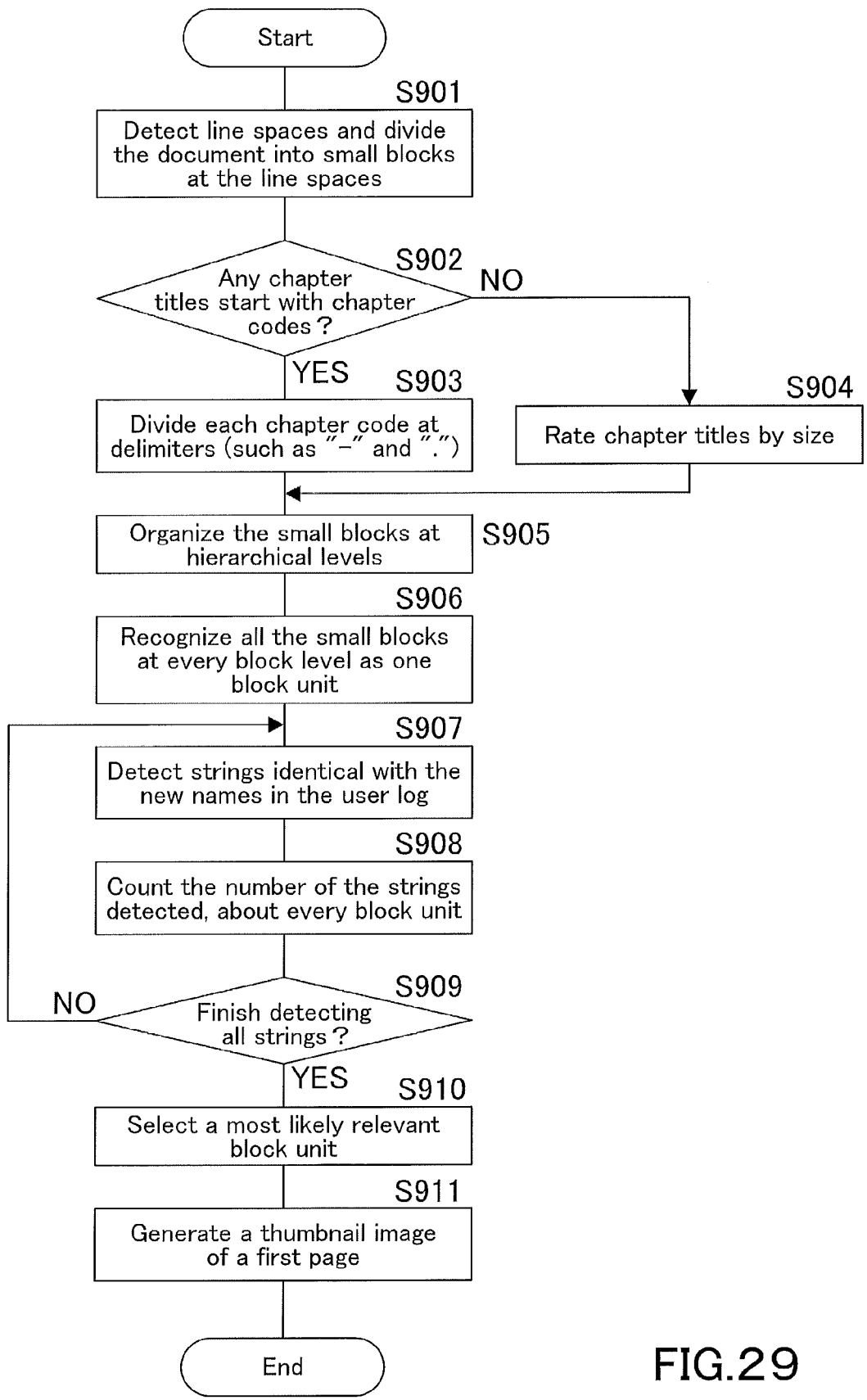
FIG. 29 is a flowchart representing a processing routine of the image processing apparatus.

FIG. 29 is a flowchart representing a processing routine of the image processing apparatus 1 in this mode of implementation.

Explanation of the operations of Steps S901 to S906 will be omitted hereinafter because they are identical with those of Steps S101 to S106 in FIG. 11.

Then, strings identical with the names in the user's renaming log are detected from the document 100 in Step S907, and the number of the strings detected is counted about every block unit in Step S908.

In Step S909, it is judged whether or not all strings identical with the names are completely detected from the file (document 100). If all such strings are not completely detected yet therefrom (NO in Step S909), the processing routine returns to Step S907. If all such strings are completely detected therefrom (YES in Step S909), a block unit with the largest number among those counted (largest number among the numbers of the strings detected) is determined to be the most likely relevant block unit of the user in Step S910.

In Step S911, an image of a first page of the most likely relevant block unit is generated as a thumbnail image.

As described above, a most likely relevant block unit of the user currently operating the image processing apparatus 1 is determined according to the number of strings identical with the new names to which the name of the document 100 has been changed by the user. This makes it possible to determine a most likely relevant block unit of the user precisely.

[Mode of Implementation 10]

In this mode of implementation, a transmission log including subjects of the e-mails having been attached to the document 100 to be transmitted from the image processing apparatus 1 is stored in advance about every user, strings identical with the subjects of the e-mails are detected from the entire document 100, and a most likely relevant block unit is determined according to the number of the strings detected.

Figure 30:
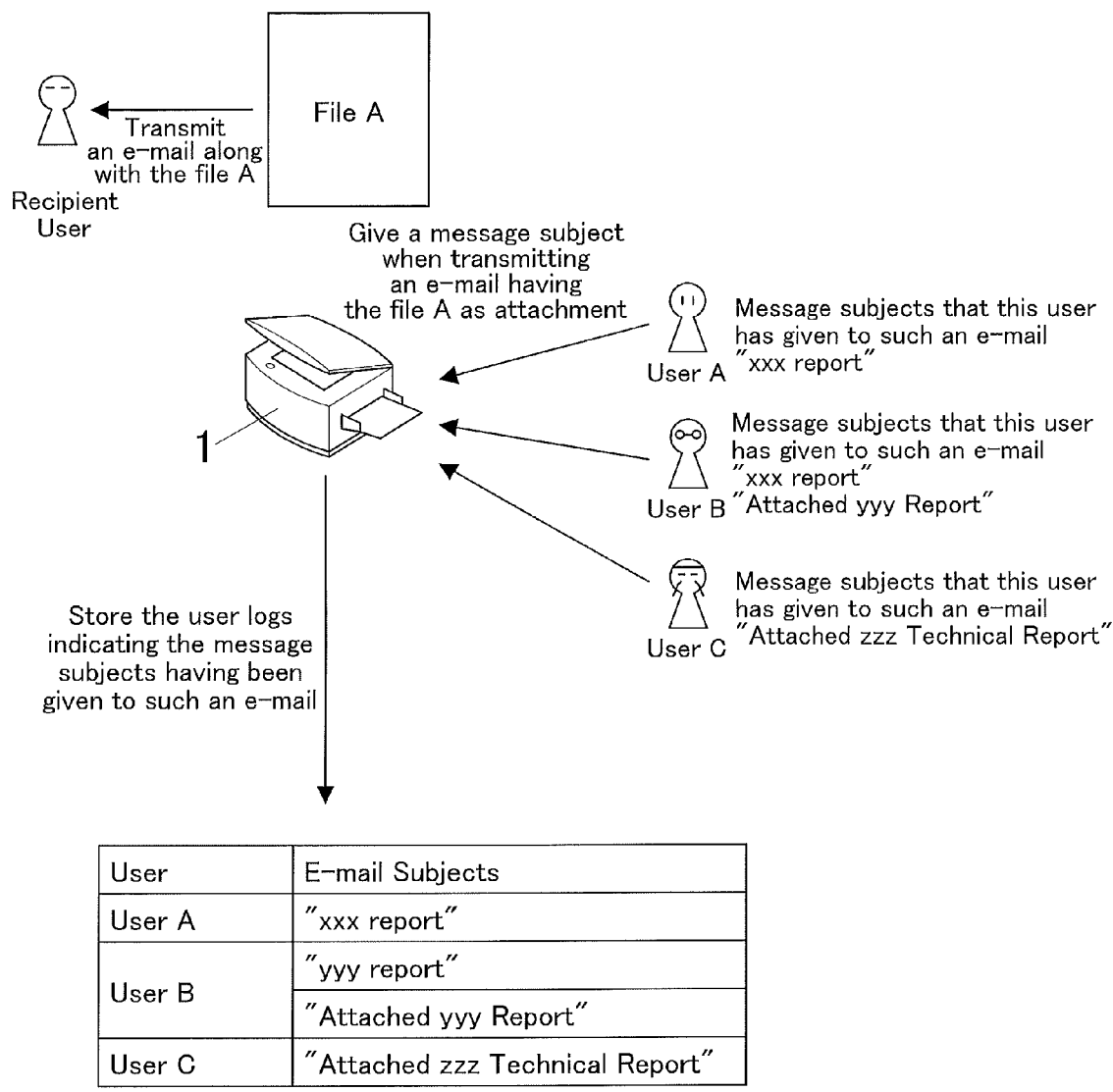
FIG. 30, which relates to still yet another mode of implementing the present invention, is a view to explain the following operations: picking up from a document, all identical strings with titles of the e-mails that User A and User B have transmitted the document previously; and selecting block units most connected to User A and User B based on how many strings having been picked up, respectively.

For example, as illustrated in FIG. 30, User A has attached the document 100 (file A) to an e-mail to transmit under the subject "xxx Report"; User B has attached the document (file A) to an e-mail to transmit under the subject "yyy Report" or "yyy Report Attached"; and User C has attached the document (file A) to an e-mail to transmit under the subject "zzz Technical Report Attached". FIG. 30 is a table containing these logs, stored on the memory 15.

A most likely relevant block unit of the user currently operating the image processing apparatus 1 to view thumbnail images is determined based on the strings in the subject fields of the e-mails that the user has transmitted with the document 100 attached.

More specifically, strings identical with the subjects of the e-mails are detected from the entire document 100, and the number of the strings detected is counted about every block unit. A block unit with the largest number among those counted is determined to be the most likely relevant block unit of the user, and a reduced image of a first page of the most likely relevant block unit is generated as a thumbnail image.

Figure 31:
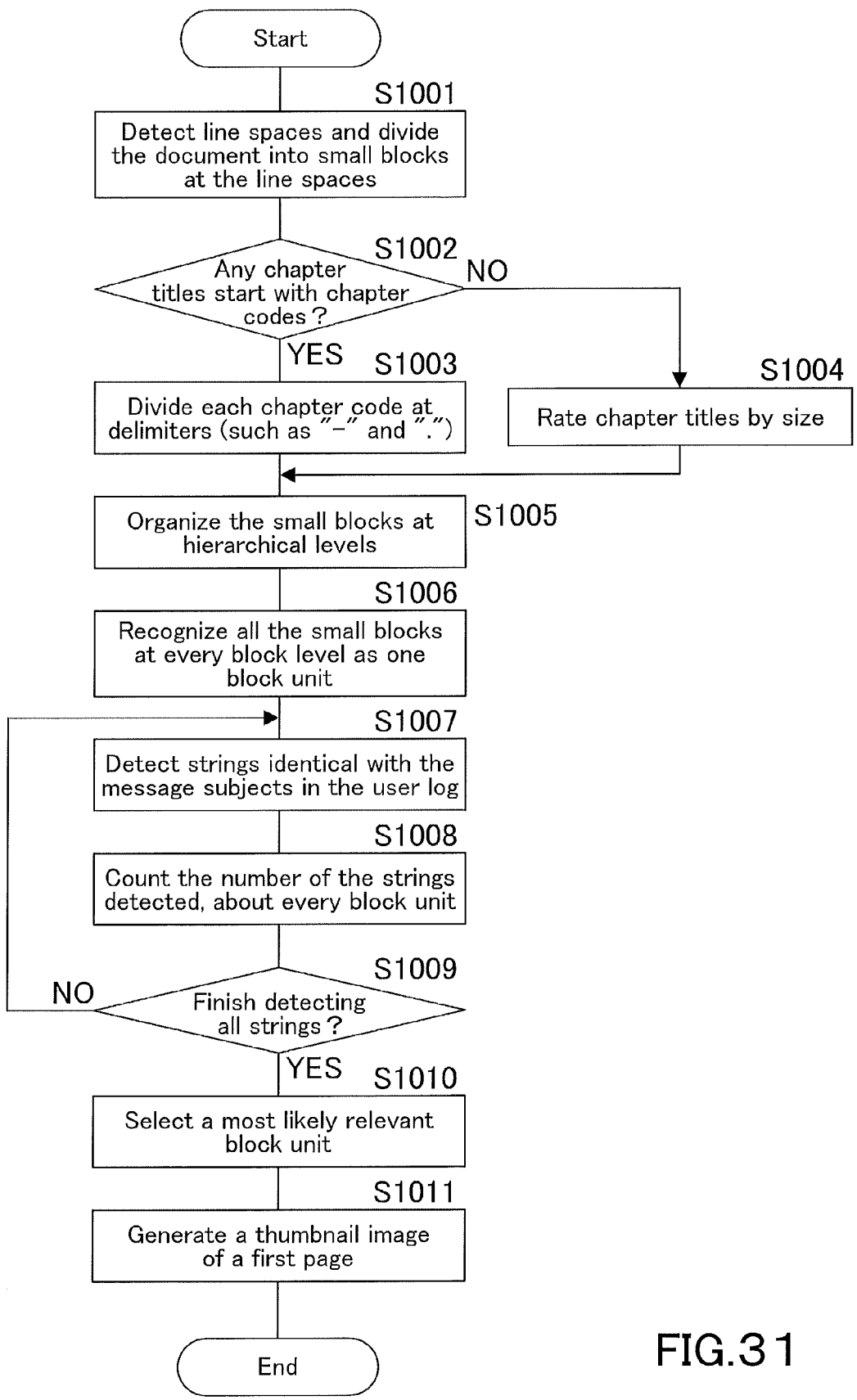
FIG. 31 is a flowchart representing a processing routine of the image processing apparatus.

FIG. 31 is a flowchart representing a processing routine of the image processing apparatus 1 in this mode of implementation.

Explanation of the operations of Steps S1001 to S1006 will be omitted hereinafter because they are identical with those of Steps S101 to S106 in FIG. 11.

Strings identical with the e-mail subjects in the user's transmission log are detected from the document 100 in Step S1007, and the number of the strings detected is counted about every block unit in Step S1008.

In Step S1009, it is judged whether or not all strings identical with the e-mail subjects are completely detected from the file (document 100). If all such strings are not completely detected yet therefrom (NO in Step S1009), the processing routine returns to Step S1007. If all such strings are completely detected therefrom (YES in Step S1009), a block unit with the largest number among those counted (largest number among the numbers of the strings detected) is determined to be the most likely relevant block unit of the user in Step S1010.

In Step S1011, an image of a first page of the most likely relevant block unit is generated as a thumbnail image.

This mode of implementation also makes it possible to determine a most likely relevant block unit of the user currently operating the image processing apparatus 1 precisely.

[Mode of Implementation 11]

In this mode of implementation, the number of times by page the document 100 has been transmitted from the image processing apparatus 1 is stored in advance about every user, the largest number among those stored is obtained about every block unit, and a block unit with the largest number among the largest numbers obtained is determined to be the most likely relevant block unit.

For example, as illustrated in FIG. 26, the number of times the document has been transmitted by User A is: 0, 2, 1, 0, 0 about Pages 1 to 5, respectively, and the number of times the document has been transmitted by User B is: 0, 0, 0, 2, 3 about Pages 1 to 5, respectively. As for User A, there are block units with the largest numbers, 2 and 0, and a block unit with the largest number among the largest numbers obtained, 2 and with the chapter title "xxx Technical Report" is determined to be the most likely relevant block unit of User A. As for User B, there are block units with the largest numbers, 0 and 3, and a block unit with the largest number among the largest numbers obtained, 3 and with the chapter title "yyy Technical Report" is determined to be the most likely relevant block unit of User B.

Figure 32:
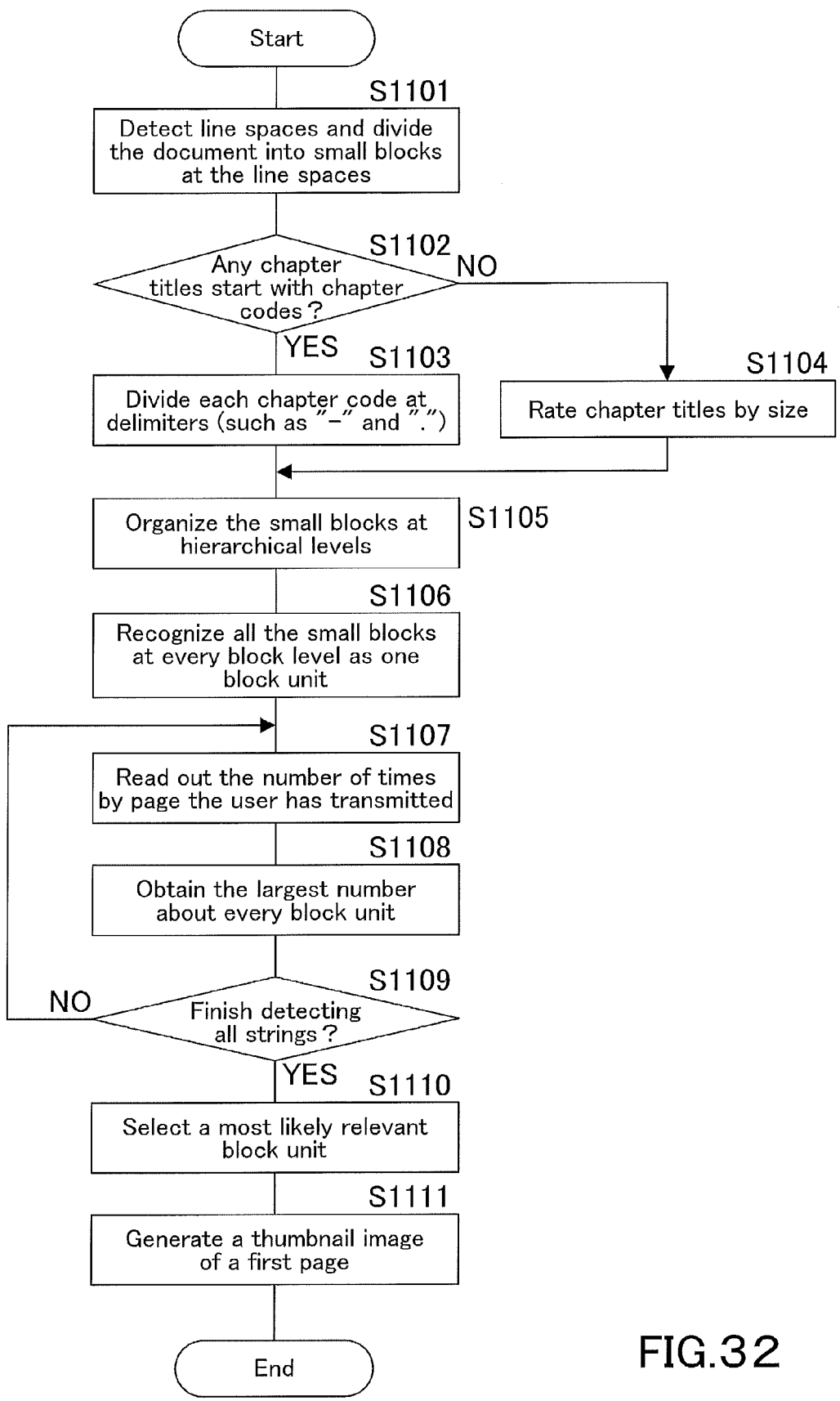
FIG. 32 is a flowchart representing a processing routine of an image processing apparatus according to another mode of implementing the present invention.

FIG. 32 is a flowchart representing a processing routine of the image processing apparatus 1 in this mode of implementation.

Explanation of the operations of Steps S1101 to S1106 will be omitted hereinafter because they are identical with those of Steps S101 to S106 in FIG. 11.

The user's log indicating the number of times by page the document 100 has been transmitted by the user is read out from the memory 15 in Step S1107, and the largest number among them is obtained about every block unit in Step S1108.

In Step S1109, it is judged whether or not the largest number among them is obtained about every block unit. If the largest number among them is not obtained yet about every block unit (NO in Step S1109), the processing routine returns to Step S1107. If the largest number among them is obtained about every block unit (YES in Step S1109), a block unit with the largest number among the largest numbers obtained is determined to be the most likely relevant block unit of the user in Step S1110.

In Step S1111, an image of a first page of the most likely relevant block unit is generated as a thumbnail image.

In this mode of implementation, the number of times by page the document has been transmitted is stored in advance, the largest number among those stored is obtained, and a block unit with the largest number among the largest numbers obtained is determined to be the most likely relevant block unit. Alternatively, the number of times by page the document has been transmitted may be stored in advance, a sum of these numbers may be calculated about every block unit, and a block unit with the largest sum among those calculated may be determined to be the most likely relevant block unit.

A most likely relevant block unit of the user may be determined based on the log stored in advance, indicating the number of times by predetermined area such as small block, instead of page, the document has been transmitted.

This mode of implementation also makes it possible to determine a most likely relevant block unit of the user currently operating the image processing apparatus 1 precisely.

Some modes of implementing the present invention have been described in the foregoing specification, which does not mean that the present invention shall be construed as limited to the particular forms disclosed.

For example, a most likely relevant block unit of the user currently operating the image processing apparatus 1 to view thumbnail images is determined according to the user's preview period, the number of times the document has been printed by the user, the number of times the document has been transmitted by the user, and the like. Alternatively, a total number of times any objects in the document 100 have been moved by the user may be obtained about every page or area, and a block unit with the largest total number obtained may be determined to be the most likely relevant block unit of the user.

Figure 33:
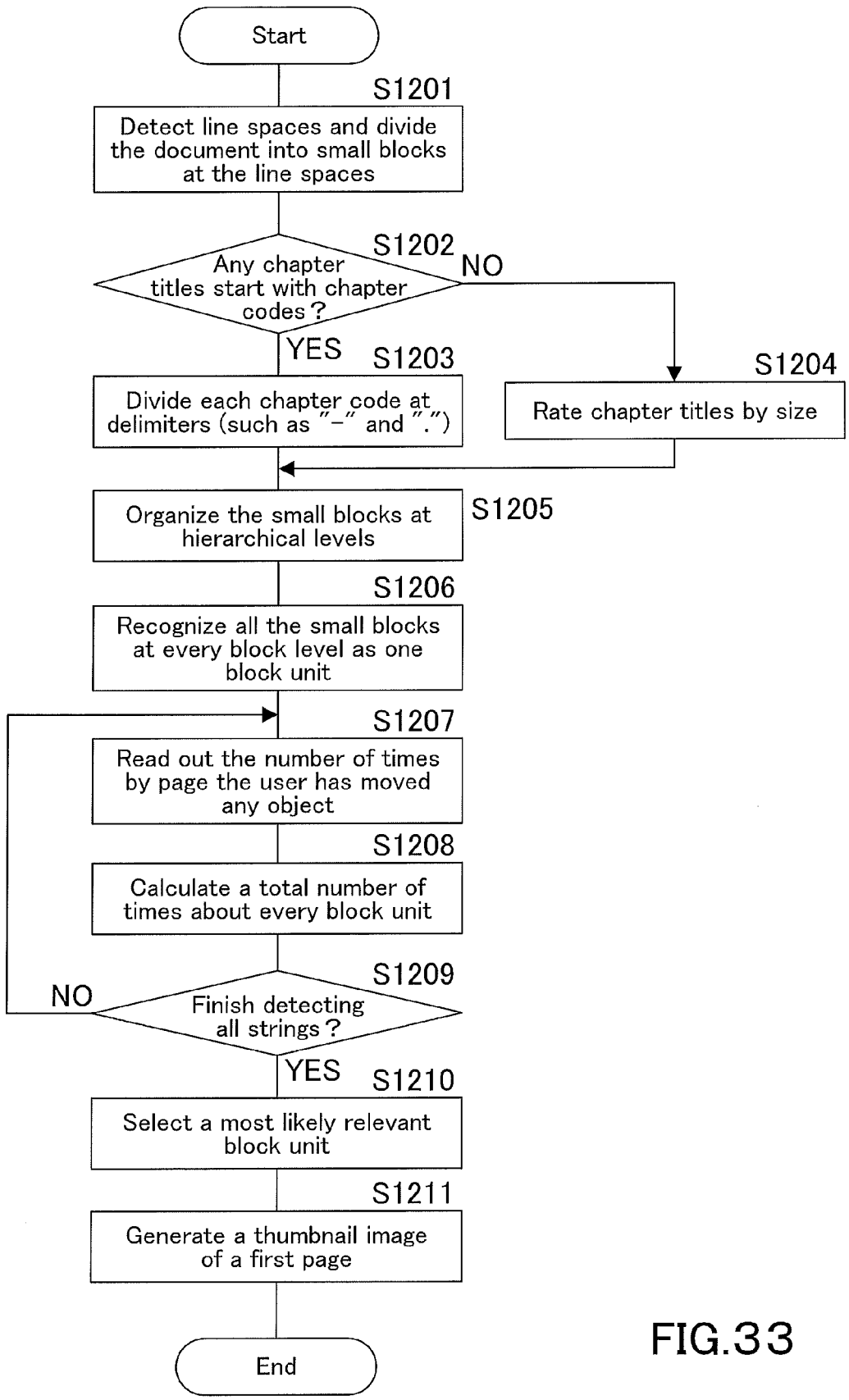
FIG. 33 is a flowchart representing a processing routine of an image processing apparatus according to yet another mode of implementing the present invention.

FIG. 33 is a flowchart representing a processing routine of the image processing apparatus 1 in this mode of implementation, in which a block unit with the largest sum among those calculated is determined to be the most likely relevant block unit of the user.

Explanation of the operations of Steps S1201 to S1206 will be omitted hereinafter because they are identical with those of Steps S101 to S106 in FIG. 11.

A log indicating the number of times any objects in the document 100 have been moved is stored in advance on the memory 15, about every user. The user's log indicating the number of times any objects in the document 100 have been moved is read out from the memory 15 about every page in Step S1207, and a total number of times any objects have been moved is calculated about every block unit in Step S1108.

In Step S1209, it is judged whether or not a total number of times about every block unit is obtained. If a total number of times about every block unit is not obtained yet (NO in Step S1209), the processing routine returns to Step S1207. If a total number of times about every block unit is obtained (YES in Step S1209), a block unit with the largest total number obtained is determined to be the most likely relevant block unit of the user in Step S1210.

In Step S1211, an image of a first page of the most likely relevant block unit is generated as a thumbnail image.

In this mode of implementation, the number of times by page the document has been transmitted is stored in advance, the largest number among those stored is obtained about every block unit, and a block unit with the largest number among the largest numbers obtained is determined to be the most likely relevant block unit. Alternatively, the number of times by page the document has been transmitted may be stored in advance, a sum of these numbers may be calculated about every block unit, and a block unit with the largest sum among those calculated may be determined to be the most likely relevant block unit.

Alternatively, instead of an image of a first page of the most likely relevant block unit, an image of a certain page or area of the most likely relevant block unit, with the longest total preview period, the largest number of times the document has been printed, the largest number of times the document has been transmitted, or the largest number of times any objects have been moved, may be generated as a thumbnail image.

The present invention having been described above may be applied to the following modes.

[1] An image processing apparatus comprising:
a divider which divides a document consisting of a plurality of pages, into separate block units;

a block unit selector which selects a block unit most likely linked to a user to view a thumbnail image, among the block units obtained by the divider; and a thumbnail image generator which generates a thumbnail image based on an image and/or text from the block unit selected by the block unit selector.

[2] The image processing apparatus as recited in the aforementioned item [1], wherein the divider divides the document into small blocks at line spaces detected from the document, organizes the small blocks at hierarchical levels, and the small blocks organized at the most superordinate level constitute the block units.

[3] The image processing apparatus as recited in the aforementioned item [1] or [2], wherein the thumbnail image generator generates a thumbnail image including an image on a first page and/or a chapter title of the block unit selected by the block unit selector as the block unit most likely linked to the user to view a thumbnail image.

[4] The image processing apparatus as recited in any of the aforementioned items [1] to [3], further comprising a memory which stores a log indicating the operations that the user to view a thumbnail image has performed about a page or area of the document, wherein the block unit selector selects a block unit including this page or area, as a block unit most likely linked to the user to view a thumbnail image, based on the log stored on the memory.

[5] The image processing apparatus as recited in any of the aforementioned items [1] to [4], wherein the document corresponds to a target data piece to be transmitted to a recipient user while the user to view a thumbnail image corresponds to the recipient user.

[6] The image processing apparatus as recited in any of the aforementioned items [1] to [4], wherein:

the document corresponds to a target data piece to be transmitted to a plurality of recipient users at one time while the user to view a thumbnail image corresponds to the plurality of recipient users;

the block unit selector selects block units most likely linked to the recipient users, among the block units; and the thumbnail image generator generates thumbnail images for the recipient users, based on images and/or texts from the block units selected by the block unit selector.

[7] The image processing apparatus as recited in any of the aforementioned items [1], [2], and [4] to [6], further comprising:

an image area detector which detects an image area from the block unit selected by the block unit selector; and a text area detector which detects a text area referring to the image area detected by the image area detector, wherein the thumbnail image generator generates a thumbnail image based on the detected image area if the text area includes an outline or overview of the document or if the text area includes a summary or conclusion of the document, giving preference to an outline or overview of the document over a summary or conclusion of the document.

[8] The image processing apparatus as recited in any of the aforementioned items [1], [2], and [4] to [6], further comprising:

an image area detector which detects an image area from the block unit selected by the block unit selector; and an image sorter which sorts images from the image area detected by the image area detector, into the following categories: drawing, table, and photo, wherein the thumbnail image generator generates a thumbnail image based on one or more images from one of the following categories: drawing, table, and photo in this order of preference.

[9] The image processing apparatus as recited in the aforementioned item [7] or [8], wherein the thumbnail image generator generates a thumbnail image by merging the image which is referred to by the best superior text area, to the chapter title from the block unit selected by the block unit selector.

[10] The image processing apparatus as recited in any of the aforementioned items [1] to [9], further comprising:

a string detector which detects a string identical with at least one of the following information objects of the user to view a thumbnail image: user name, business section, and personal identification, from the document; and a counter which counts the total number of the strings detected by the string detector, about every block unit, wherein the block unit selector selects a block unit most likely linked to the user to view a thumbnail image, according to the total number of strings obtained by the counter.

[11] The image processing apparatus as recited in any of the aforementioned items [1] to [9], further comprising:

a keyword memory which stores a log indicating the keywords by which possible operating users have searched the document;

a string detector which detects a string identical with any of the keywords stored on the keyword memory, from the document; and a counter which counts the total number of the strings detected by the string detector, about every block unit, wherein the block unit selector selects a block unit most likely linked to the user to view a thumbnail image, according to the total number of strings obtained by the counter.

[12] The image processing apparatus as recited in any of the aforementioned items [1] to [9], further comprising:

a preview period memory which stores a preview period for which the user to view a thumbnail image has previewed the document, about every page or area; and a calculator which calculates the total preview period for which the user to view a thumbnail image has previewed the document, about every block unit, based on those stored on the preview period memory, wherein the block unit selector selects a block unit most likely linked to the user to view a thumbnail image, according to the total preview periods obtained by the calculator.

[13] The image processing apparatus as recited in any of the aforementioned items [1] to [9], further comprising:

a printing memory which stores the number of times by page or area the user to view a thumbnail image has printed the document; and a calculator which calculates the total number of times the user to view a thumbnail image has printed the document, about every block unit, based on those stored on the printing memory, wherein the block unit selector selects a block unit most likely linked to the user to view a thumbnail image, according to the total number of times obtained by the counter.

[14] The image processing apparatus as recited in any of the aforementioned items [1] to [9], further comprising:

a document name memory which stores a log indicating the new names to which the user to view a thumbnail image has changed the name of the document;

a string detector which detects a string identical with any of the new names stored on the file name memory, from the document; and a counter which counts the total number of the strings detected by the string detector, about every block unit, wherein the block unit selector selects a block unit most likely linked to the user to view a thumbnail image, according to the total number of strings obtained by the counter.

[15] The image processing apparatus as recited in any of the aforementioned items [1] to [9], further comprising:

a message subject memory which stores a subject of an e-mail message received from the user to view a thumbnail image, with the document attached;

a string detector which detects a string identical with any of the message subjects stored on the message subject memory, from the document; and a counter which counts the total number of the strings detected by the string detector, about every block unit, wherein the block unit selector selects a block unit most likely linked to the user to view a thumbnail image, according to the total number of strings obtained by the counter.

[16] The image processing apparatus as recited in any of the aforementioned items [1] to [9], further comprising:

a transmission memory which stores the number of times by page or area the user to view a thumbnail image has transmitted the document; and a calculator which calculates the total number of times the user to view a thumbnail image has transmitted the document, about every block unit, based on those stored on the transmission memory, wherein the block unit selector selects a block unit most likely linked to the user to view a thumbnail image, according to the total number of times obtained by the counter.

[17] The image processing apparatus as recited in any of the aforementioned items [1] to [9], further comprising:

a movement memory which stores the number of times by page or area the user to view a thumbnail image has moved an object in the document; and a calculator which calculates the total number of times the user to view a thumbnail image has moved an object in the document, about every block unit, based on those stored on the movement memory, wherein the block unit selector selects a block unit most likely linked to the user to view a thumbnail image, according to the total number of times obtained by the counter.

[18] The image processing apparatus as recited in any of the aforementioned items [1] to [17], further comprising a contents page detector which detects a contents page from the document, wherein the divider divides the document excluding the contents page, into separate block units.

[19] A thumbnail image generating method for an image processing apparatus, comprising:

dividing a document consisting of a plurality of pages, into separate block units;

selecting a block unit most likely linked to a user to view a thumbnail image, among the block units obtained; and generating a thumbnail image based on an image and/or text from the block unit selected.

[20] A non-transitory computer-readable recording medium with a thumbnail image generating program being stored thereon to make a computer of an image processing apparatus execute:

dividing a document consisting of a plurality of pages, into separate block units;

selecting a block unit most likely linked to a user to view a thumbnail image, among the block units obtained; and generating a thumbnail image based on an image and/or text from the block unit selected.

According to the mode of implementation in the aforementioned item [1], the image processing apparatus is allowed to: divide a document consisting of a plurality of pages, into separate block units; select a block unit most likely linked to a user to view a thumbnail image, among the block units obtained; and generate a thumbnail image based on an image and/or text from the selected block unit. The user to view a thumbnail image therefore would be able to see a thumbnail image which is familiar to himself/herself. This makes it possible to generate a helpful thumbnail image for the user to view a thumbnail image and show him/her if the file is what he/she really wants or the content of the document fairly easily.

According to the mode of implementation in the aforementioned item [2], the image processing apparatus is allowed to divide the document into small blocks at line spaces detected from the document; organize the small blocks at hierarchical levels; and make the small blocks organized at the most superordinate level, into the block units. This makes it possible to divide the document into block units more easily.

According to the mode of implementation in the aforementioned item [3], the image processing apparatus is allowed to generate a thumbnail image of a first page of the block unit more likely linked to the user to view a thumbnail image.

According to the mode of implementation in the aforementioned item [4], the image processing apparatus is allowed to select a block unit most likely linked to the user to view a thumbnail image because of including a page or area about which the user to view a thumbnail image has performed operations most often, for example, based on a log indicating all the operations having been performed by the user to view a thumbnail image.

According to the mode of implementation in the aforementioned item [5], the image processing apparatus is allowed to generate an image which is most likely linked to and familiar to a recipient user of a target data piece, as a thumbnail image.

According to the mode of implementation in the aforementioned item [6], the image processing apparatus is allowed to generate an image which is most likely linked to and familiar to a recipient user of a target data piece, as a thumbnail image.

According to the mode of implementation in the aforementioned item [7], if a text area, which refers to an image from the block unit selected, includes an outline or overview of the document, the image processing apparatus is allowed to generate a thumbnail image based on the image referred to by the text area. If the same text area includes a summary or conclusion of the document instead of an outline or overview of the document, the image processing apparatus is allowed to generate a thumbnail image based on the image referred to by the text area.

According to the mode of implementation in the aforementioned item [8], the image processing apparatus is allowed to: detect an image area from the block unit selected; sort images from the image area detected, into the following categories: drawing, table, and photo; and generate a thumbnail image based on one or more images from one of the following categories: drawing, table, and photo in this order of preference.

According to the mode of implementation in the aforementioned item [9], the image processing apparatus is allowed to generate a thumbnail image by merging the image from one of the following categories: drawing, table, and photo in this order of preference, to the chapter title from the block unit selected. In this way, this makes it possible to generate a more helpful thumbnail image for the user to view a thumbnail image.

According to the mode of implementation in the aforementioned item [10], the image processing apparatus is allowed to: detect strings identical with any of the name, business section, and personal identification information of the user to view a thumbnail image, from the document; and count the number of the strings detected therefrom, about every block unit. The image processing apparatus is further allowed to determine a block unit most likely linked to the user to view a thumbnail image, according to the number of strings counted. For example, a block unit with the largest number of strings counted is determined to be the block unit most likely linked to the user to view a thumbnail image. This makes it possible to determine a block unit most likely linked to the user to view a thumbnail image, precisely.

According to the mode of implementation in the aforementioned item [11], the image processing apparatus is allowed to: store in advance a log indicating the keywords by which the document has been searched for, about every possible user to view a thumbnail image; detect a string identical with any of the keywords, from the document; and count the number of the strings detected therefrom. The image processing apparatus is further allowed to determine a block unit most likely linked to the user to view a thumbnail image, according to the number of strings counted. For example, a block unit with the largest number of strings counted is determined to be the block unit most likely linked to the user to view a thumbnail image. This makes it possible to determine a block unit most likely linked to the user to view a thumbnail image, precisely.

According to the mode of implementation in the aforementioned item [12], the image processing apparatus is allowed to store in advance a preview period for which the user to view a thumbnail image has previewed the document, about every page or area; and calculates the total preview period for which the user to view a thumbnail image has previewed the document, about every block unit, based on those stored in advance. The image processing apparatus is further allowed to determine a block unit most likely linked to the user to view a thumbnail image, according to the number of strings obtained. For example, a block unit with the longest total preview period is determined to be the block unit most likely linked to the user to view a thumbnail image. This makes it possible to determine a block unit most likely linked to the user to view a thumbnail image, precisely.

According to the mode of implementation in the aforementioned item [13], the image processing apparatus is allowed to store in advance the number of times the user to view a thumbnail image has printed the document, about every page or area; and calculate the total number of times the user to view a thumbnail image has printed the document, about every block unit, based on those stored in advance. The image processing apparatus is further allowed to determine a block unit most likely linked to the user to view a thumbnail image, according to the number of times obtained. This makes it possible to determine a block unit most likely linked to the user to view a thumbnail image, precisely.

According to the mode of implementation in the aforementioned item [14], the image processing apparatus is allowed to: store in advance a log indicating the new names to which the user to view a thumbnail image has changed the name of the document; detect a string identical with any of the new names stored in advance, from the document; and count the number of the strings detected therefrom, about every block unit. The image processing apparatus is further allowed to determine a block unit most likely linked to the user to view a thumbnail image, according to the number of strings counted. For example, a block unit with the largest number of strings counted is determined to be the block unit most likely linked to the user to view a thumbnail image. This makes it possible to determine a block unit most likely linked to the user to view a thumbnail image, precisely.

According to the mode of implementation in the aforementioned item [15], the image processing apparatus is allowed to: store in advance subjects of the e-mail messages that the user to view a thumbnail image has transmitted along with the document as an attachment file; detect a string identical with any of the subjects stored in advance, from the document; and count the number of the strings detected therefrom, about every block unit. The image processing apparatus is further allowed to determine a block unit most likely linked to the user to view a thumbnail image, according to the number of strings counted. For example, a block unit with the largest number of strings counted is determined to be the block unit most likely linked to the user to view a thumbnail image. This makes it possible to determine a block unit most likely linked to the user to view a thumbnail image, precisely.

According to the mode of implementation in the aforementioned item [16], the image processing apparatus is allowed to: store in advance the number of times the user to view a thumbnail image has transmitted the document, about every page or area; and calculate the total number of times the user to view a thumbnail image has transmitted the document, about every block unit, based on those stored in advance. The image processing apparatus is further allowed to determine a block unit most likely linked to the user to view a thumbnail image, according to the number of times obtained.

This makes it possible to determine a block unit most likely linked to the user to view a thumbnail image precisely.

According to the mode of implementation in the aforementioned item [17], the image processing apparatus is allowed to: store in advance the number of times the user to view a thumbnail image has moved an object in the document, about every page or area; and calculate the total number of times the user to view a thumbnail image has moved an object in the document, about every block unit, based on those stored in advance. The image processing apparatus is further allowed to determine a block unit most likely linked to the user to view a thumbnail image, according to the number of times obtained. For example, a block unit with the largest number of times obtained is determined to be the block unit most likely linked to the user to view a thumbnail image. This makes it possible to determine a block unit most likely linked to the user to view a thumbnail image precisely.

According to the mode of implementation in the aforementioned item [18], the image processing apparatus is allowed to divide the document excluding a contents page, into separate block units. This makes it possible to prevent from generating a thumbnail image of a contents page of the document.

According to the mode of implementation in the aforementioned item [19], the thumbnail image generating method makes it possible to generate a thumbnail image helpful for the user to view a thumbnail image and show him/her if the file is what he/she really wants or the content of the document fairly easily.

According to the mode of implementation in the aforementioned item [20], a computer of the image processing apparatus is allowed to execute an operation to generate a thumbnail image helpful for the user to view a thumbnail image.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
a divider which divides a document consisting of a plurality of pages, into separate block units;
a block unit selector which selects a block unit most likely linked to a user to view a thumbnail image, among the block units obtained by the divider; and
a thumbnail image generator which generates a thumbnail image based on an image and/or text from the block unit selected by the block unit selector;
wherein the block unit selector selects the block unit based on personal information relating to the user stored in advance.

2. The image processing apparatus as recited in claim 1, wherein the divider divides the document into small blocks at line spaces detected from the document, organizes the small blocks at hierarchical levels, and the small blocks organized at the most superordinate level constitute the block units.

3. The image processing apparatus as recited in claim 1, wherein the thumbnail image generator generates a thumbnail image including an image on a first page and/or a chapter title of the block unit selected by the block unit selector as the block unit most likely linked to the user to view a thumbnail image.

4. The image processing apparatus as recited in claim 1, further comprising a memory which stores a log indicating the operations that the user to view a thumbnail image has performed about a page or area of the document, wherein the block unit selector selects a block unit including this page or area, as a block unit most likely linked to the user to view a thumbnail image, based on the log stored on the memory.

5. The image processing apparatus as recited in claim 1, wherein the document corresponds to a target data piece to be transmitted to a recipient user while the user to view a thumbnail image corresponds to the recipient user.

6. The image processing apparatus as recited in claim 1, wherein:
the document corresponds to a target data piece to be transmitted to a plurality of recipient users at one time while the user to view a thumbnail image corresponds to the plurality of recipient users;
the block unit selector selects block units most likely linked to the recipient users, among the block units; and
the thumbnail image generator generates thumbnail images for the recipient users, based on images and/or texts from the block units selected by the block unit selector.

7. The image processing apparatus as recited in claim 1, further comprising:
an image area detector which detects an image area from the block unit selected by the block unit selector; and
a text area detector which detects a text area referring to the image area detected by the image area detector,
wherein the thumbnail image generator generates a thumbnail image based on the detected image area if the text area includes an outline or overview of the document or if the text area includes a summary or conclusion of the document, giving preference to an outline or overview of the document over a summary or conclusion of the document.

8. The image processing apparatus as recited in claim 1, further comprising:
an image area detector which detects an image area from the block unit selected by the block unit selector; and
an image sorter which sorts images from the image area detected by the image area detector, into the following categories: drawing, table, and photo,
wherein the thumbnail image generator generates a thumbnail image based on one or more images from one of the following categories: drawing, table, and photo in this order of preference.

9. An image processing apparatus comprising:
a divider which divides a document consisting of a plurality of pages, into separate block units;
a block unit selector which selects a block unit most likely linked to a user to view a thumbnail image, among the block units obtained by the divider; and
a thumbnail image generator which generates a thumbnail image based on an image and/or text from the block unit selected by the block unit selector;
an image area detector which detects an image area from the block unit selected by the block unit selector; and
a text area detector which detects a text area referring to the image area detected by the image area detector,
wherein the thumbnail image generator generates a thumbnail image based on the detected image area if the text area includes an outline or overview of the document or if the text area includes a summary or conclusion of the document, giving preference to an outline or overview of the document over a summary or conclusion of the document;
wherein the thumbnail image generator generates a thumbnail image by merging the image which is referred to by the detected text area, to a chapter title from the block unit selected by the block unit selector.

10. The image processing apparatus as recited in claim 1, further comprising:
a string detector which detects a string identical with at least one of the following information objects of the user to view a thumbnail image: user name, business section, and personal identification, from the document; and a counter which counts the total number of the strings detected by the string detector, about every block unit, wherein the block unit selector selects a block unit most likely linked to the user to view a thumbnail image, according to the total number of strings obtained by the counter.

11. The image processing apparatus as recited in claim 1, further comprising:

a keyword memory which stores a log indicating the keywords by which possible operating users have searched the document;

a string detector which detects a string identical with any of the keywords stored on the keyword memory, from the document; and a counter which counts the total number of the strings detected by the string detector, about every block unit, wherein the block unit selector selects a block unit most likely linked to the user to view a thumbnail image, according to the total number of strings obtained by the counter.

12. The image processing apparatus as recited in claim 1, further comprising:

a preview period memory which stores a preview period for which the user to view a thumbnail image has previewed the document, about every page or area; and a calculator which calculates the total preview period for which the user to view a thumbnail image has previewed the document, about every block unit, based on those stored on the preview period memory, wherein the block unit selector selects a block unit most likely linked to the user to view a thumbnail image, according to the total preview periods obtained by the calculator.

13. The image processing apparatus as recited in claim 1, further comprising:

a printing memory which stores the number of times by page or area the user to view a thumbnail image has printed the document; and a calculator which calculates the total number of times the user to view a thumbnail image has printed the document, about every block unit, based on those stored on the printing memory, wherein the block unit selector selects a block unit most likely linked to the user to view a thumbnail image, according to the total number of times obtained by the counter.

14. The image processing apparatus as recited in claim 1, further comprising:

a document name memory which stores a log indicating the new names to which the user to view a thumbnail image has changed the name of the document;

a string detector which detects a string identical with any of the new names stored on the file name memory, from the document; and a counter which counts the total number of the strings detected by the string detector, about every block unit, wherein the block unit selector selects a block unit most likely linked to the user to view a thumbnail image, according to the total number of strings obtained by the counter.

15. The image processing apparatus as recited in claim 1, further comprising:

a message subject memory which stores a subject of an e-mail message received from the user to view a thumbnail image, with the document attached;

a string detector which detects a string identical with any of the message subjects stored on the message subject memory, from the document; and a counter which counts the total number of the strings detected by the string detector, about every block unit, wherein the block unit selector selects a block unit most likely linked to the user to view a thumbnail image, according to the total number of strings obtained by the counter.

16. The image processing apparatus as recited in claim 1, further comprising:

a transmission memory which stores the number of times by page or area the user to view a thumbnail image has transmitted the document; and a calculator which calculates the total number of times the user to view a thumbnail image has transmitted the document, about every block unit, based on those stored on the transmission memory, wherein the block unit selector selects a block unit most likely linked to the user to view a thumbnail image, according to the total number of times obtained by the counter.

17. The image processing apparatus as recited in claim 1, further comprising:

a movement memory which stores the number of times by page or area the user to view a thumbnail image has moved an object in the document; and a calculator which calculates the total number of times the user to view a thumbnail image has moved an object in the document, about every block unit, based on those stored on the movement memory, wherein the block unit selector selects a block unit most likely linked to the user to view a thumbnail image, according to the total number of times obtained by the counter.

18. The image processing apparatus as recited in claim 1, further comprising a contents page detector which detects a contents page from the document, wherein the divider divides the document excluding the contents page, into separate block units.

19. A thumbnail image generating method for an image processing apparatus, comprising:

dividing a document consisting of a plurality of pages, into separate block units;

selecting a block unit most likely linked to a user to view a thumbnail image, among the block units obtained; and generating a thumbnail image based on an image and/or text from the block unit selected;

wherein selecting the block unit comprises selecting the block based on personal information relating to the user stored in advance.

20. A non-transitory computer-readable recording medium with a thumbnail image generating program being stored thereon to make a computer of an image processing apparatus execute:

dividing a document consisting of a plurality of pages, into separate block units;

selecting a block unit most likely linked to a user to view a thumbnail image, among the block units obtained; and generating a thumbnail image based on an image and/or text from the block unit selected;

wherein selecting the block unit comprises selecting the block based on personal information relating to the user stored in advance.

* * * * *